US009764985B2

(12) United States Patent
Dabrowski et al.

(10) Patent No.: US 9,764,985 B2
(45) Date of Patent: Sep. 19, 2017

(54) CERAMIC MATERIALS FOR GAS SEPARATION AND OXYGEN STORAGE

(71) Applicants: Bogdan Dabrowski, Bolingbrook, IL (US); Steven Remsen, Hillsboro, OR (US)

(72) Inventors: Bogdan Dabrowski, Bolingbrook, IL (US); Steven Remsen, Hillsboro, OR (US)

(73) Assignee: Board of Trustees of Northern Illinois University, DeKalb, IL (US)

( * ) Notice: Subject to any disclaimer, the term of this patent is extended or adjusted under 35 U.S.C. 154(b) by 75 days.

(21) Appl. No.: 14/657,263

(22) Filed: Mar. 13, 2015

(65) Prior Publication Data
US 2015/0251955 A1    Sep. 10, 2015

Related U.S. Application Data

(63) Continuation of application No. 13/284,847, filed on Oct. 28, 2011, now Pat. No. 8,980,213.

(60) Provisional application No. 61/407,580, filed on Oct. 28, 2010.

(51) Int. Cl.
| C04B 35/00  | (2006.01) |
| C04B 35/01  | (2006.01) |
| B01D 53/02  | (2006.01) |
| B01D 53/22  | (2006.01) |
| B01D 71/02  | (2006.01) |
| C01G 45/12  | (2006.01) |
| B01D 69/10  | (2006.01) |
| C01B 13/02  | (2006.01) |

(52) U.S. Cl.
CPC ............ *C04B 35/016* (2013.01); *B01D 53/02* (2013.01); *B01D 53/228* (2013.01); *B01D 69/10* (2013.01); *B01D 71/024* (2013.01); *C01B 13/0244* (2013.01); *C01G 45/1221* (2013.01); *C01G 45/1264* (2013.01); *B01D 2253/1124* (2013.01); *B01D 2255/206* (2013.01); *B01D 2255/2061* (2013.01); *B01D 2255/2073* (2013.01); *B01D 2257/104* (2013.01); *B01D 2325/12* (2013.01); *C01B 2210/0007* (2013.01); *C01P 2002/72* (2013.01); *C01P 2002/76* (2013.01); *C01P 2002/77* (2013.01); *C01P 2002/88* (2013.01); *C04B 2235/3224* (2013.01); *C04B 2235/3225* (2013.01); *C04B 2235/3227* (2013.01); *C04B 2235/3229* (2013.01); *C04B 2235/3267* (2013.01); *C04B 2235/3286* (2013.01); *C04B 2235/3298* (2013.01); *C04B 2235/652* (2013.01); *C04B 2235/656* (2013.01); *C04B 2235/658* (2013.01); *C04B 2235/6565* (2013.01); *C04B 2235/663* (2013.01); *C04B 2235/761* (2013.01); *C04B 2235/767* (2013.01); *C04B 2235/768* (2013.01); *C04B 2235/79* (2013.01); *Y02P 20/129* (2015.11)

(58) Field of Classification Search
CPC ... C04B 35/016; C01B 13/0244; B01D 69/10; B01D 71/024; C01G 45/1221; C01G 45/1264
USPC ....... 95/138, 11, 54; 423/579, 263; 501/126, 501/152; 502/4; 60/783, 772
See application file for complete search history.

(56) References Cited

U.S. PATENT DOCUMENTS

| 2,490,986 | A | * | 12/1949 | Symonds | C01B 13/083 252/372 |
| 2,642,340 | A | * | 6/1953 | Martin | C01B 13/086 422/142 |
| 3,121,611 | A | * | 2/1964 | Parker | C01B 13/02 423/219 |
| 3,509,694 | A | * | 5/1970 | Imai | B01D 53/22 95/54 |
| 3,812,048 | A | * | 5/1974 | Massey | C01B 15/043 252/184 |
| 5,240,480 | A | | 8/1993 | Thorogood et al. | |
| 5,478,444 | A | * | 12/1995 | Liu | B01D 53/326 204/295 |
| 5,824,278 | A | | 10/1998 | Yao | |
| 6,059,858 | A | * | 5/2000 | Lin | B01D 53/228 95/104 |
| 6,582,814 | B2 | | 6/2003 | Swiler et al. | |
| 7,160,360 | B2 | * | 1/2007 | Wu | B01D 53/02 95/117 |
| 7,338,549 | B2 | | 3/2008 | Bulow et al. | |
| 7,556,676 | B2 | | 7/2009 | Nagabhushana et al. | |
| 8,980,213 | B2 | | 3/2015 | Dabrowski et al. | |
| 2009/0206297 | A1 | | 8/2009 | Karppinen et al. | |
| 2009/0220779 | A1 | | 9/2009 | Doerr et al. | |

(Continued)

FOREIGN PATENT DOCUMENTS

| CN | 101609889 | 12/2009 |
| WO | 2012/058644 | 5/2012 |

OTHER PUBLICATIONS

Mailed Feb. 12, 2012, Application No. PCT/US2011/058471.
Mailed May 9, 2014, U.S. Appl. No. 13/284,847.
Mailed Jul. 18, 2014, U.S. Appl. No. 13/284,847.
Mailed Aug. 4, 2014, U.S. Appl. No. 13/284,847.
Mailed Nov. 3, 2014, U.S. Appl. No. 13/284,847.
Motohashi, T. et al., "Uncommon oxygen intake/release capability of layered cobalt oxides, REBaCo$_4$O$_{7+\delta}$: Novel oxygen-storage materials", Materials Science and Engineering B, vol. 148, pp. 196-198, (2008).

(Continued)

*Primary Examiner* — Steven Bos
(74) *Attorney, Agent, or Firm* — Evan Law Group LLC

(57) ABSTRACT

A manganese oxide contains M1, optionally M2, Mn and O. M1 is selected from the group consisting of In, Sc, Y, Dy, Ho, Er, Tm, Yb and Lu. M2 is different from M1, and M2 is selected from the group consisting of Bi, In, Sc, Y, La, Ce, Pr, Nd, Sm, Eu, Gd, Tb, Dy, Ho, Er, Tm, Yb and Lu. These ceramic materials are hexagonal in structure, and provide superior materials for gas separation and oxygen storage.

34 Claims, 18 Drawing Sheets

(56) References Cited

U.S. PATENT DOCUMENTS

2010/0278719 A1\* 11/2010 Lambert ............ C01B 13/0203
423/579
2012/0118149 A1 5/2012 Dabrowski et al.

OTHER PUBLICATIONS

Shelley, S., "Oxygen and nitrogen: onward and upward", Chemical Engineering Progress, vol. 105, No. 1, pp. 1-4, (2009).
Kašpar, J. et al., "Automotive catalytic converters: current status and some perspectives", Catalysis Today, vol. 77, pp. 419-449, (2003).
Kodama, T. et al., "Thermochemical cycles for high-temperature solar hydrogen production", Chemical Reviews, vol. 107, No. 10, pp. 4048-4077, (2007).
Xu, Z. et al., "Effect of oxygen storage materials on the performance of proton-exchange membrane fuel cells", Journal of Power Sources, vol. 115, pp. 40-43, (2003).
Sakakini, B.H. et al., "A study of the kinetics and mechanism of the adsorption and anaerobic partial oxidation of $n$-butane over a vanadyl pyrophosphate catalyst", Journal of Catalysis, vol. 189, pp. 253-262, (2000).
Ciferno, J., "Pulverized Coal Oxycombustion Power Plants: vol. 1: Bituminous coal to electricity", National Energy Technology Laboratory, Final Report, pp. 1-315, DOE/NETL-2007/1291, (2008).
Rydén, M. et al., "Novel oxygen-carrier materials for chemical-looping combustion and chemical-looping reforming; $La_xSr_{1-x}Fe_yCo_{1-y}O_{3-\sigma}$ perovskites and mixed-metal oxides of NiO, $Fe_2O_3$ and $Mn_3O_4$", International Journal of Greenhouse Gas Control, vol. 2, pp. 21-36, (2008).
Klara, J.M., "Chemical-Looping process in a Coal-to-Liquids Configuration; Independent assessment of the potential of Chemical-Looping in the context of a Fischer-Tropsch Plant", National Energy Technology Laboratory, pp. 1-15, DOE/NETL-2008/1307, (2007).
Readman, J.E. et al., "$La_{0.8}Sr_{0.2}Co_{0.2}Fe_{0.8}O_{3-\sigma}$ as a potential oxygen carrier in a chemical looping type reactor, an in-situ powder X-ray diffraction study", Journal of Materials Chemistry, vol. 15pp. 1931-1937, (2005).
Figueroa, J.D. et al., "Advances in CO2 capture technology—The U.S. Department of energy's carbon sequestration program", International Journal of Greenhouse Gas Control, vol. 2, pp. 9-20, (2008).
Pei, S. et al., "Failure mechanisms of ceramic membrane reactors in partial oxidation of methane to synthesis gas", Catalysis Letters, vol. 30, pp. 201-212, (1995).
He, H. et al., "Defective structure, oxygen mobility, oxygen storage capacity, and redox properties of RE-based (RE=Ce, Pr) solid solutions", Catalysis Today, vol. 90, pp. 245-254, (2004).
Di Monte, R. et al., "Oxygen storage and catalytic NO removal promoted by $CeO_2$-containing mixed oxides", Journal of Alloys and Compounds, vol. 275-277, pp. 877-885, (1998).
Nagai, Y. et al., "X-ray absorption fine structure analysis of local structure of $CeO_2$—$ZrO_2$ mixed oxides with the same composition ratio (Ce/Zr=1)", Catalysis Today, vol. 74, pp. 225-234, (2002).
Singh, P. et al., "$Ce_{2/3}Cr_{1/3}O_{2+y}$: A new oxygen storage material based on the fluorite structure", Chemistry of Materials, vol. 20, pp. 7268-7273, (2008).
Karppinen, M. et al., "Oxygen nonstoichiometry in $YBaCo_4O_{7+\sigma}$: Large low-temperature oxygen absorption/desorption capability", Chemistry of Materials, vol. 18, pp. 490-494, (2006).
Kadota, S. et al., "R-site substitution effect on the oxygen-storage capability of $RBaCo_4O_{7+\sigma}$", Chemistry of Materials, vol. 20, pp. 6378-6381, (2008).
Räsänen, S. et al., "Stability and oxygen-storage characteristics of Al-substituted $YBaCo_4O_{7+\sigma}$", Journal of Solid State Chemistry, vol. 183, pp. 692-695, (2010).
Chmaissem, O. et al., "Formation of $Co^{3+}$ octahedra and tetrahedra in $YBaCo_4O_{8.1}$", Journal of Solid State chemistry, vol. 181, pp. 664-672, (2008).
Motohashi, T. et al., "Remarkable oxygen intake/release capability of $BaYMn_2O_{5+\sigma}$: Applications to oxygen storage technologies" Chemistry of Materials, vol. 22, pp. 3192-3196, (2010).
Yakel, H.L. et al., "On the crystal structure of the manganese (III) trioxides of the heavy lanthanides and yttrium", Acta Crystallographica, vol. 16, pp. 957-962, (1963).
Yakel Jr, H.L. "On the structures of some compounds of the perovskite type", Acta Crystallographica, vol. 8, pp. 394-398, (1955).
Shannon, R.D. "Revised effective ionic radii and systematic studies of interatomic distances in halides and chalcogenides", Acta Crystallographica, vol. A32, pp. 751-767, (1976).
Dabrowski, B. et al., "Tolerance factor rules for $Sr_{1-x-y}Ca_xBa_yMnO_3$ perovskites", Journal of Solid State Chemistry, vol. 170, pp. 154-164, (2003).
Dabrowski, B. et al., "Structural, transport, and magnetic properties of $RMnO_3$ perovskites (R=La, Pr, Nd, Sm, $^{153}$Eu, Dy)", Journal of Solid State Chemistry, vol. 178, pp. 629-637, (2005).
Kamegashira, N. et al., "Synthesis and crystal structure of hexagonal $DyMnO_3$" Materials Science Forum vols. 449-452, pp. 1045-1048, (2004).
Park, J. et al., "Magnetic ordering and spin-liquid state of $YMnO_3$", Physical Review B, vol. 68, pp. 104426-1-104426-6, (2003).
Lee, S. et al., "Direct observation of a coupling between spin, lattice and electric dipole moment in multiferroic $YMnO_3$", Physical Review B, vol. 71, pp. 180413-1-180413-4, (2005).
Ivanov, V.Y. et al., "Magnetic properties and phase transitions in hexagonal $DyMnO_3$ single crystals", Physics of the Solid State, vol. 48, No. 9, pp. 1726-1729, (2006).
Carp, O. et al., "New synthesis routes for obtaining dysprosium manganese perovskites", Journal of Alloys and Compounds, vol. 351, pp. 314-318, (2003).
Brinks, H.W. et al., "Synthesis of metastable perovskite-type $YMnO_3$ and $HoMnO_3$", Journal of Solid State Chemistni, vol. 129, pp. 334-340, (1997).
Suescun, L. et al., "Oxygen ordered phases in $La_xSr_{1-x}MnO_y$, ($0 \leq x \leq 0.2$, $2.5 \leq y \leq 3$): An in situ neutron powder diffraction study", Chemistry of Materials, vol. 20, No. 4, pp. 1636-1645, (2008).
Zhou, J-S. et al., "Hexagonal versus perovskite phase of manganite $RMnO_3$ (R=Y, Ho, Er, Tm, Yb, Lu)", Physical Review B, vol. 74, pp. 014422-1-014422-7, (2006).
Waintal, A. et al., "Transformation sous haute pression de la forme hexagonale de $MnT^1O_3$ ($T^1$=Ho, Er, Tm, Yb, Lu) en une forme perovskite", Materials Research Bulletin, vol. 2, pp. 819-822, (1967).
Tachibana, M. et al., "Jahn-teller distortion and magnetic transitions in perovskite $RMnO_3$ (R=Ho, Er, Tm, Yb, and Lu)", Physical Review B, vol. 75, pp. 144425-1-144425-5, (2007).
Uusi-Esko, K. et al., "Characterization of $RMnO_3$ (R=Sc, Y, Dy-Lu): High-pressure synthesized metastable perovskites and their hexagonal precursor phases", Materials Chemistry and Physics, vol. 112, pp. 1029-1034, (2008).
Lonkai, T. et al., "Development of the high-temperature phase of hexagonal manganites", Physical Review B, vol. 69, pp. 134108-1-134108-10, (2004).
Jeong, I-K. et al., "High-temperature structural evolution of hexagonal multiferroic $YMnO_3$ and $YbMnO_3$"; Journal of Applied Crystallography, vol. 40, pp. 730-734, (2007).
Kamata, K. et al., "Thermogravimetric study of rare earth manganites $AMnO_3$ (A=Sm, Dy, Y, Er, Yb) at 1200° C.", Materials Research Bulletin, vol. 14, issue 8, pp. 1007-1012, (1979).
Katsufuji, T. et al., "Crystal structure and magnetic properties of hexagonal $RMnO_3$ (R=Y, Lu, and Sc) and the effect of doping", Physical Review B, vol. 66, pp. 134434-1-134434-8, (2002).
Fiebig, M. et al., "Spin-rotation phenomena and magnetic phase diagrams of hexagonal $RMnO_3$", Journal of Applied Physics, vol. 93, No. 10, pp. 8194-8196, (2003).
Vajk, O.P. et al., "Magnetic order and spin dynamics in ferroelectric $HoMnO_3$", Physical Review Letters, vol. 94, pp. 087601-1-087601-4, (2005).
Rao, C.N.R. et al., "New routes to multiferroics", Journal of Materials Chemistry, vol. 17, pp. 4931-4938, (2007).

(56) References Cited

OTHER PUBLICATIONS

Choi, W.S. et al., "Electronic structures of hexagonal $RMnO_3$ (R=Gd, Tb, Dy, and Ho) thin films: Optical spectroscopy and first-principles calculations", Physical Review B, vol. 77, pp. 045137-1-045137-7, (2008).

Nandi, S. et al., "Magnetic structure of $Dy^{3+}$, in hexagonal multiferroic $DyMnO_3$", Physical Review B, vol. 78, pp. 075118-1-075118-5, (2008).

Dabrowski, B. et al., "Effective oxygen content and properties of $La_{0.74}Ca_{0.26}MnO_{3+d}$ as a function of synthesis conditions", Journal of Solid State Chemistry, vol. 144, pp. 461-466, (1999).

Bukowski, Z. et al., "Effect of oxygen stoichiometry on properties of $La_{0.815}Sr_{0.185}MnO_{3+d}$"; Journal of Applied Physics, vol. 87, No. 9, pp. 5031-5033, (2000).

Zhou, H.D. et al., "Effect of Ga doping on the multiferroic properties of $RMn_{1-x}Ga_xO_3$ (R=Ho,Y)", Physical Review B, vol. 72, pp. 224401-1-224401-5, (2005).

Remsen, S. "Properties of transition metal oxides for gas separation and oxygen storage applications", Dissertation, Northern Illinois University, pp. 1-118, (2010).

Fu, B. et al., "Synthesis and properties of strontium-doped yttrium manganite", Journal of Materials Research, vol. 9, No. 10, pp. 2645-2653, (1994).

Chen, X. et al., "Thermal and chemical expansion of Sr-doped lanthanum cobalt oxide $(La_{1-x}Sr_xCoO_{3-o})$", Chemistry of Materials, vol. 17, No. 17, pp. 4537-4546, (2005).

Miyoshi, S. et al., "Lattice expansion upon reduction of perovskite-type $LaMnO3$ with oxygen-deficit nonstoichiometry", Solid State Ionics, vol. 161, pp. 209-217, (2003).

McIntosh, S. et al., "Oxygen stoichiometry and chemical expansion of $Ba_{0.5}Sr_{0.5}Co_{0.8}Fe_{0.2}O_{3-o}$ measured by in situ neutron diffraction", Chemistry of Materials, vol. 18, No. 8, pp. 2187-2193, (2006).

"Development of ion transport membrane (ITM) oxygen technology for integration in IGCC and other advanced power generation systems", National Energy Technology Laboratory, project 136, 2 pages, found at netl.doe.gov/publications/factsheets/project/Proj136.pdf, (2009).

Foy, K. et al., "Comparison of ion transport membranes", National Energy Technology Laboratory, Proceedings of the Fourth Annual Conference on Carbon Capture and Sequestration Doe/Netl, pp. 1-11, May 2-5, 2005.

Brunetti, A. et al., "Membrane technologies for CO2 separation" Journal of Membrane Science, vol. 359, pp. 115-125, (2010).

Shelley, S., "Capturing CO2: Membrane systems move forward", Chemical Engineering Progress, vol. 105, No. 4, pp. 42-47, (2009).

Cooper, H.W., "Producing electricity and chemicals simultaneously", Chemical Engineering Progress, vol. 106, No. 2, pp. 24-32, (2010).

Remsen, S. et al., "Synthesis and oxygen content dependent properties of hexagonal $DyMnO3+\sigma$" Journal of Solid State Chemistry, vol. 184, pp. 2306-2314, (2011).

Dabrowski, B. et al., "Synthesis and characterization of non-stoichiometric hexagonal $Dy_{1-x}Y_xMnO_{3+\sigma}$" Functional Materials Letters, vol. 4, issue 2, pp. 147-150, (2011).

Remsen, S. et al., "Synthesis and oxygen storage capacities of hexagonal $Dy_{1-x}Y_xMnO_{3+\sigma}$" Chemistry of Materials, vol. 23, No. 17, pp. 3818-3827, (2011).

International Search Report dated Feb. 2, 2012 for PCT application No. PCT/US2011/058471.

Imamura, N. et al., "Magnetic dilution in the frustrated ferromagnetic pyrochlore system, $(Dy_{1-x}Lu_x)_2Mn_2O_7$" Solid State Communications, vol. 144, pp. 98-102, (2007).

Imamura, N. et al., "Magnetic properties of $R_2Mn_2O_7$ pyrochlore rare-earth solid solutions", Physical Review B, vol. 82, pp. 132407.1-132407.4, (2010).

Subramanian, M.A. et al., "Ferromagnetic $R_2Mn_2O_7$ pyrochlores (R=Dy-Lu, Y)", Journal of Solid State Chemistry, vol. 72, pp. 24-30, (1988).

"Air separation technology-ion transport membrane (ITM)" Air Products and Chemicals, Inc., 4 pages, found at www.airproducts.com/~/media/Downloads/Article/Literature_Cryogenic-Air-Separation-ITM-28007017GLB.ashx (2010).

Sallavuard, G. et al., "Sur les monogallates lunthanidiques $LnGaO_3$ note", C. R. Academy of Science Paris, Series C, vol. 268, pp. 1050-1053, (1969). (including English translation of abstract).

\* cited by examiner

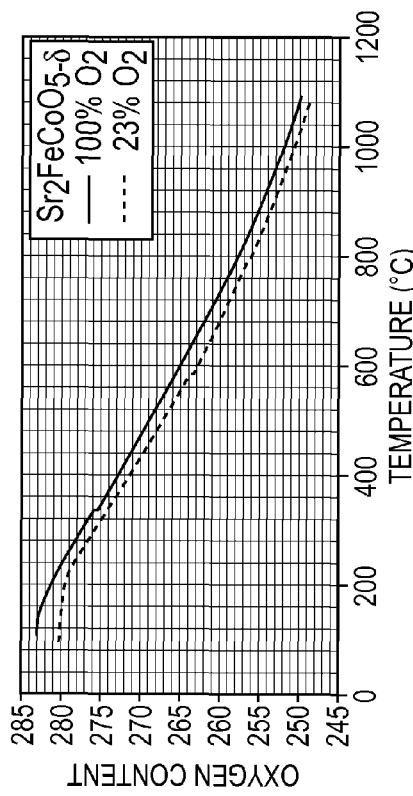
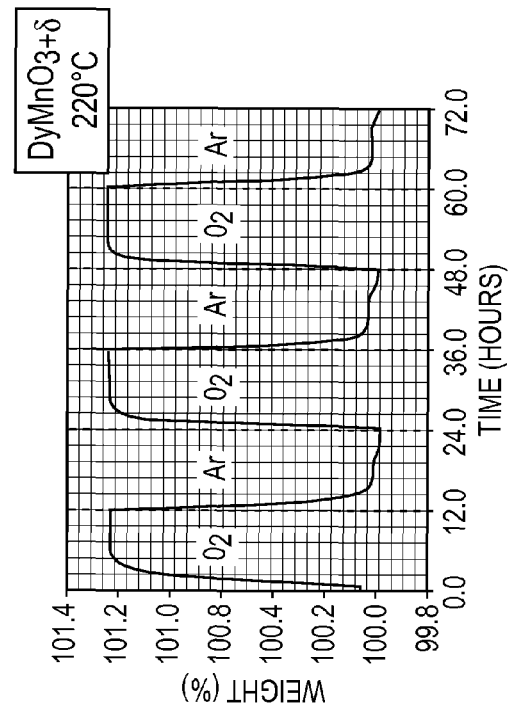
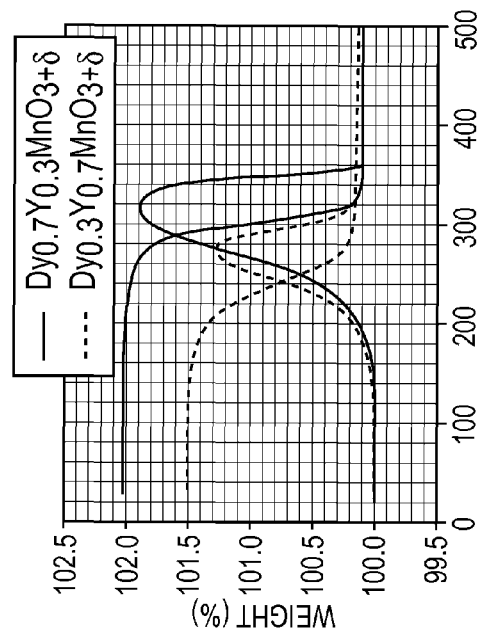
FIG. 2a
FIG. 2b
FIG. 2c

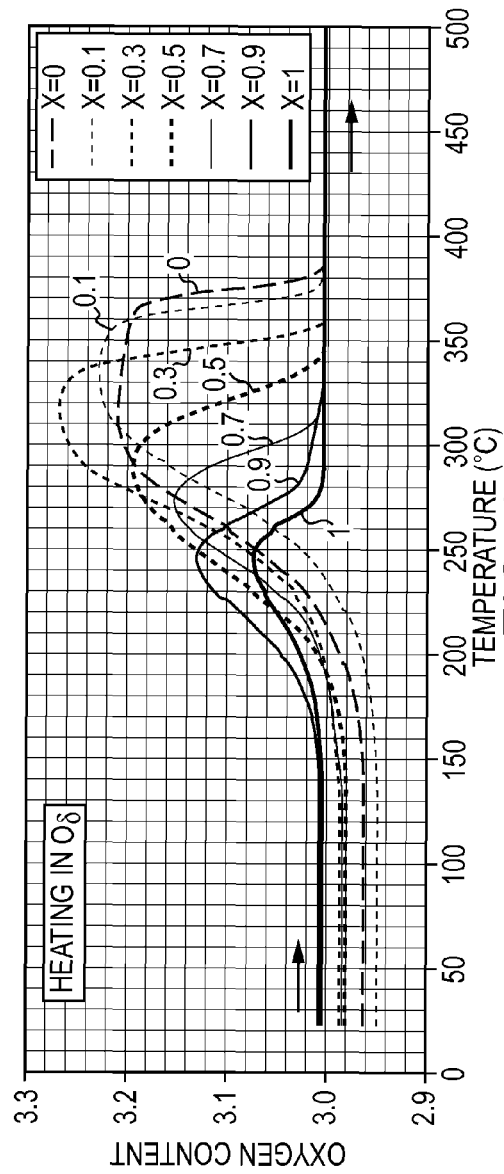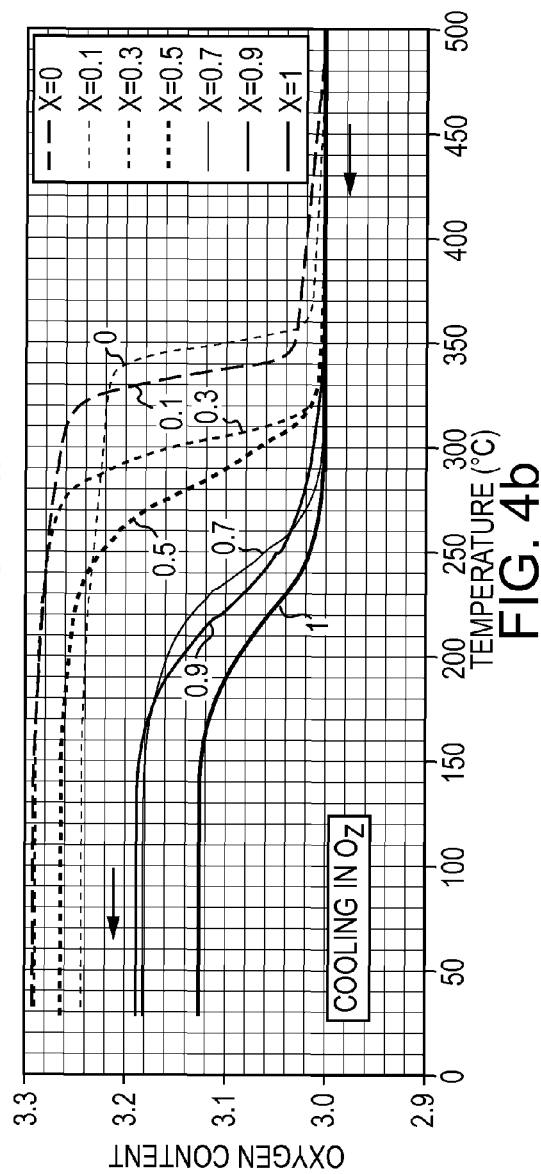

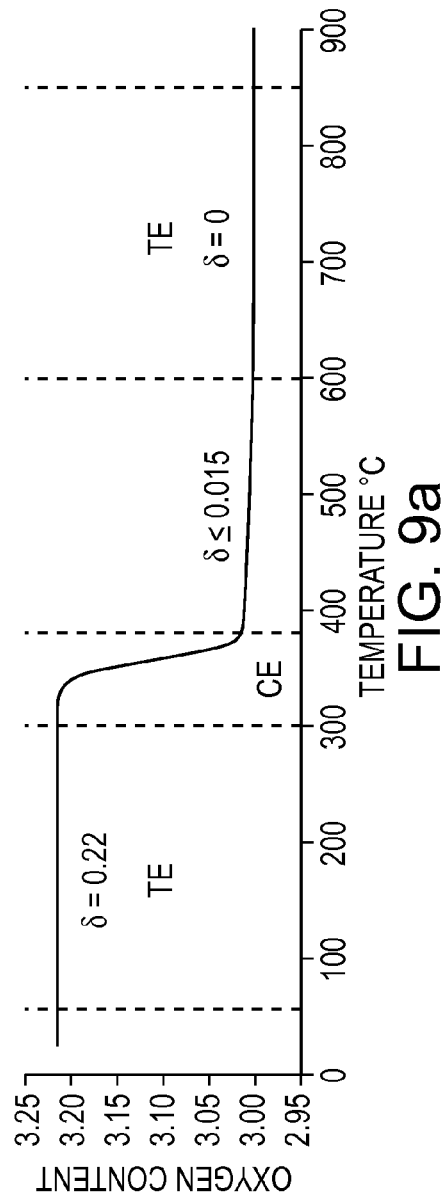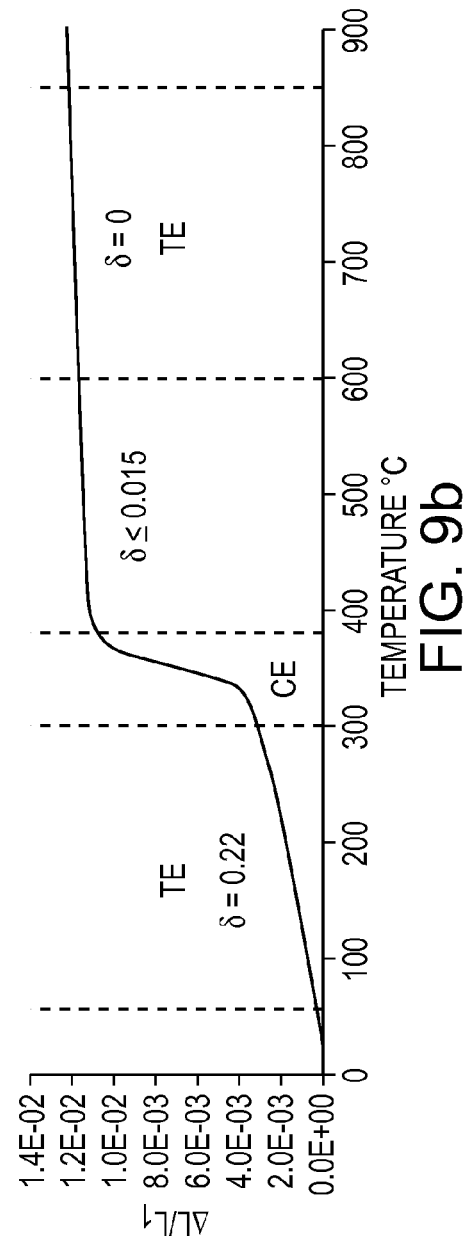
FIG. 9a
FIG. 9b

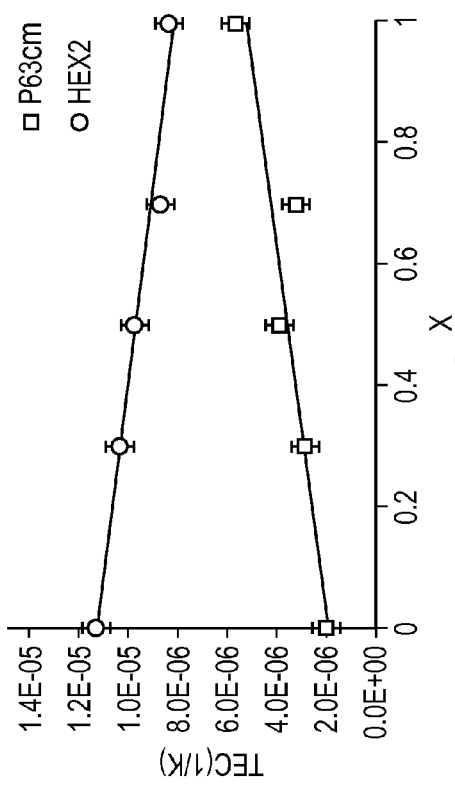
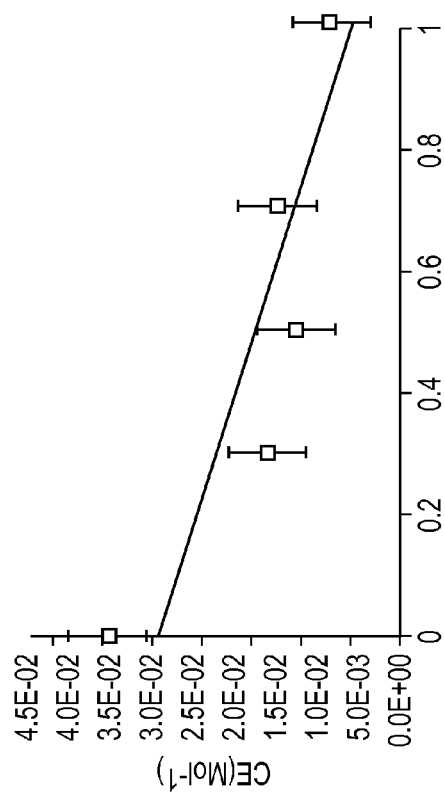
FIG. 10a
FIG. 10b

CERAMIC MATERIALS FOR GAS SEPARATION AND OXYGEN STORAGE

CROSS-REFERENCE TO RELATED APPLICATION

The present application claims the benefit of U.S. Provisional Application 61/407,580, filed 28 Oct. 2010, the entire contents of which are hereby incorporated by reference, except where inconsistent with the present application.

FEDERALLY SPONSORED RESEARCH OR DEVELOPMENT

This invention was made with Government support under grant no. DMR-0706610 awarded by the National Science Foundation. The United States Government has certain rights in this invention.

BACKGROUND

The present invention relates to the selective storage and release of oxygen and gas separation by ceramic materials. In particular, the present invention relates to methods of elevated temperature air separation, oxygen storage, or any process related to temperature or oxygen partial-pressure dependent absorption and desorption of oxygen with ceramic materials.

Recently ceramic materials have been increasingly researched due to their reversible oxygen storage/release capacities (OSC) at elevated-temperatures. New ceramic materials for elevated-temperature air separation are strong candidates to compete with cryogenic distillation for commercial air separation and are also being researched for components to improve automotive exhaust catalysts, solar water splitting, hydrogen-oxygen fuel cells, various non-aerobic oxidation processes, and assorted high-temperature production processes that require high-purity oxygen (e.g. steel, copper, plastics, glass, etc.). Elevated temperature air separation methods have been projected to have 20-30% less capital and operation cost, while being significantly more energy efficient, than conventional air separation methods. The development of improved oxygen storage or carrier materials is also critical to the success of new energy related technologies such as "oxy-fuel" and "chemical looping" combustion systems for "clean coal" energy production, automotive pollution reduction, hydrogen-oxygen fuel cells, solar water splitting, and to improve the efficiency and cost of various production processes (e.g. steel, copper, plastics), and the production of synthesis gas ($H_2$, CO) by partial oxidation of methane.

Ideal materials have large values of OSC (typically measured in moles of oxygen per weight of material) and their absorption/desorption of oxygen occurs over a narrow temperature range at near atmospheric conditions. Additional properties, such as oxygen partial pressure dependence of absorption/desorption, exothermic absorption and endothermic reduction, stability/recoverability in strong reducing conditions (e.g. CO and $H_2$ atmospheres at high-temperatures), are also desired and being researched for various applications. Commercially, fluorite $Ce_{1-x}Zr_xO_2$ compositions have been the recent ceramic OSC materials of choice for air separation, which function around 500° C. and have OSCs of ~400-500 µmol-O/g in oxygen atmospheres or as high as 1500 µmol-O/g with 20% $H_2$ reversible reduction. Recent studies with $Ce_{1-x}Cr_xO_2$ have further boosted the OSC of the fluorite structure to as high as 2500 µmol-0/g in air and hydrogen atmospheres but require considerably higher reduction temperatures (550-700° C.) and contain poisonous $Cr^{6+}$. Currently, $RBaCo_4O_{7+\delta}$ (R=Y, Dy, Ho, Er, Tm, Yb, and Lu) and $YBaCo_{4-x}Al_xO_{7+\delta}$ have the best reported OSC at low-temperature, which have storage up to ~2700 µmol-O/g and completely desorb at ~400-425° C. in $O_2$. The ease of reversible phase transitions between the hexagonal P6$_3$mc $YBaCo_4O_7$ and orthorhombic Pbc2$_1$ $YBaCo_4O_{8.1}$ phases (which is a mixture of tetrahedrally and octahedrally coordinated cobalt) is responsible for its oxygen storage behavior.

$RMnO_3$ (R=rare earths) and their competing hexagonal and perovskite crystal structures have been studied for over fifty years. Conventionally, the formation of the perovskite phase versus the hexagonal phase is governed primarily by the size of the rare-earth ion in $RMnO_3$ (with constant $Mn^{3+}$ size). During high-temperature solid state synthesis in air, the perovskite phase forms easily with larger rare-earth elements (e.g. La, Pr, Nd, Sm, Gd, Tb, and Dy), while smaller size rare-earths (e.g. Ho, Er, Tm, Yb, Lu, and Y) favor the hexagonal phase. It has been observed that the perovskite phase is stable for a tolerance factor, $$t = \frac{(R-O)}{\sqrt{2}\,(Mn-O)},$$

in the range of 0.855≤t≤1 (calculated at room temperature using Shannon's ionic size values), where the perovskite structure is increasingly distorted as it approaches this lower limit and results in the transition to the hexagonal phase at t<0.855. Recently, Zhou et al. suggested that the relative large difference in density between the perovskite and hexagonal phases can have a large impact on the formation of the perovskite versus the hexagonal near the lower limit of the tolerance factor. Regardless, $DyMnO_3$ and $YMnO_3$ have tolerance factors of 0.857 and 0.854, respectively, and will tend to form the perovskite and hexagonal phases, respectively, under normal solid state reaction synthesis. Thus the average (R—O) bond length of substituted samples causes $Dy_{1-x}Y_xMnO_3$ to be on the cusp of this phase transition and, as further discussed herein, results in a mixed state under synthesis in air.

U.S. Patent Application Publication No. 2009/0206297 to Karppinen, et al. discloses an oxygen excess type metal oxide expressed with the following formula (1) and exhibiting high speed reversible oxygen diffusibility whereby a large amount of excess oxygen is diffused at a high speed and reversibly in a low temperature region:

$$A_jB_kC_mD_nO_{7+\delta} \tag{1}$$

where
A: one or more trivalent rare earth ions and Ca
B: one or more alkaline earth metals
C, D: one or more oxygen tetra-coordinated cations among which at least one is a transition metal, where j>0, k>0, and, independently, m≥0, n≥0, and j+k+m+n=6, and 0<δ≤1.5. The metal oxide has high oxygen diffusibility and large oxygen non-stoichiometry at a low temperature region (500° C. or less, in particular 400° C. or less) and a ceramic is disclosed for oxygen storage and/or an oxygen selective membrane comprised of the metal oxide. The Karppinen, et al. metal oxide has a high 2:1 ratio of expensive and poisonous Co (where C=Co) to the less expensive trivalent rare earth ions and alkaline earth metals. In addition, the compounds disclosed contain B=Ba that is highly reactive with $CO_2$ and water vapor present in air and easily decompose when heated just above their optimal OSC temperature. The Karppinen, et al. metal oxide has the disadvantages of being expensive and not thermodynamically stable or safe.

One disadvantage of currently used materials for oxygen storage or air separation is that they depend on the creation of oxygen ion vacancies or interstitial sites at high-temperatures in order to store the oxygen. Currently, the majority of materials for air separation use high-pressure (zeolites) or low-temperature (cryogenic distillation) methods consuming large amounts of energy. However, roughly over 80% of commercially produced oxygen is used in high-temperature industrial productions process and many developing applications of OSC materials operate at high-temperatures as well. For any of these current and potential systems, the redirection of the large amounts of waste heat generated from all these methods to ceramic OSC materials for onsite air separation, would undoubtedly have potential net energy, economic, and waste advantages versus conventional methods. The majority of new ceramic OSC materials for such applications rely on the creation of oxygen ion vacancies or interstitial sites at high-temperatures; however, this is a poor mechanism for currently known materials due to the high-temperatures (up to 1000° C.) and large temperature gradients (~300-800° C.) required for moderate oxygen storage capacities (less than 500 μmol-O/g).

Therefore, there remains a need for a method for the selective storage and release of oxygen that does not require extreme temperatures or large temperature gradients so as to reduce cost and energy consumption, as well as a method that is able to increase the amount of oxygen that is able to be stored.

SUMMARY

In a first aspect, the present invention is a rare-earth manganese oxide, comprising M1, optionally M2, Mn and O. M1 is selected from the group consisting of In, Sc, Y, Dy, Ho, Er, Tm, Yb and Lu. M2 is different from M1, and M2 is selected from the group consisting of Bi, In, Sc, Y, La, Ce, Pr, Nd, Sm, Eu, Gd, Tb, Dy, Ho, Er, Tm, Yb and Lu. Mn and O are present in an atomic ratio of 1:z, and z is at least 3.15.

In a second aspect, the present invention is a rare-earth manganese oxide, comprising M1, M2, Mn and O. M1 is selected from the group consisting of In, Sc, Y, Dy, Ho, Er, Tm, Yb and Lu. M2 is different from M1, and M2 is selected from the group consisting of Bi, In, Sc, Y, La, Ce, Pr, Nd, Sm, Eu, Gd, Tb, Dy, Ho, Er, Tm, Yb and Lu. M1 and M2 are present in an atomic ratio of x:1−x, and x=0.1 to 0.9.

In a third aspect, the present invention is a rare-earth manganese oxide, comprising (i) Mn, having a formal oxidation state between 2 and 3, or between 3 and 4, (ii) O, and (iii) at least one element selected from the group consisting of Bi, In, Sc, Y, La, Ce, Pr, Nd, Sm, Eu, Gd, Tb, Dy, Ho, Er, Tm, Yb and Lu. The rare-earth manganese oxide has an average temperature of maximum oxygen absorption upon heating and cooling, $T_{maxA}$, of at most 400° C., and a temperature of maximum oxygen desorption, $T_{maxD}$, of at most 400° C.

In a fourth aspect, the present invention is an oxygen conducting membrane, comprising (1) a rare-earth manganese oxide, and (2) a support material. The membrane has first and second opposing surfaces, the membrane is not permeable to nitrogen gas, the rare-earth manganese oxide forms a contiguous structure exposed on both the first and second opposing surfaces, and the rare-earth manganese oxide has an average temperature of maximum oxygen absorption upon heating and cooling, $T_{maxA}$, of at most 400° C., and a temperature of maximum oxygen desorption, $T_{maxD}$, of at most 400° C.

In a fifth aspect, the present invention is an oxygen conducting membrane, comprising (1) a manganese oxide, and (2) a support material. The membrane has first and second opposing surfaces, and the membrane is not permeable to nitrogen gas. The manganese oxide forms a contiguous structure exposed on both the first and second opposing surfaces, and the support material comprises at least one member selected from the group consisting of an organic polymer, a silicone rubber and glass.

In a sixth aspect, the present invention is a method of preparing oxygen, comprising separating oxygen from a mixture of gases containing the oxygen, by conducting the oxygen through the manganese oxide, or absorbing and releasing the oxygen from the manganese oxide.

In a seventh aspect, the present invention is a method of catalyzing a reaction with oxygen, comprising catalyzing the reaction with the manganese oxide.

In an eighth aspect, the present invention is a method generating electricity, comprising burning a carbon-containing fuel with oxygen, in a generator or power plant, wherein the oxygen is prepared by using the manganese oxide.

DEFINITIONS

The terms "rare-earth", "rare-earth element", and "rare-earth metal" include Bi, In, Sc, Y, La, Ce, Pr, Nd, Sm, Eu, Gd, Tb, Dy, Ho, Er, Tm, Yb and Lu.

The formal oxidation state of manganese, Mn, in a manganese oxide, for example a rare-earth manganese oxide, may be determined by: (a) multiplying the relative amount of each element other than manganese and oxygen by the most common oxidation of that element in an oxide, (b) multiplying the relative amount of oxygen by 2, (c) subtracting the first value (a) from the second value (b), and then dividing by the relative amount of manganese. The most common oxidation state in an oxide of Bi, In, Sc, Y, La, Pr, Nd, Sm, Eu, Gd, Tb, Dy, Ho, Er, Tm, Yb and Lu is 3; and the most common oxidation state in an oxide of Ce and Th is 4. In the case of transition metals which have two or three common oxidation states in an oxide, the most common oxidation state in an oxide is the largest common oxidation state in an oxide; example values include 2 for Cu and Ni, 3 for Co and Fe, 4 for Ti, 5 for V and Nb, 6 for Mo and W, and 7 for Re. The following is an exemplary calculation for $Dy_{0.3}Y_{0.7}MnO_{3.25}$: a=[(3×0.3)+(3×0.7)]=3; b=2×3.25=6.5; c=6.5−3=3.5; formal oxidation state of Mn =3.5/1=3.5.

The average temperature of maximum oxygen absorption upon heating and cooling, $T_{maxA}$, is the temperature where the first derivative of oxygen content as a function of temperature is a maximum, as measured by thermogravimetric analysis in pure $O_2$ with heating and cooling rates of 0.1° C./minute. The manganese oxides may have an average temperature of maximum oxygen absorption upon heating and cooling, $T_{maxA}$, of at most 400° C., of at most 300° C., or of at most 250° C.

The temperature of maximum oxygen desorption, $T_{maxD}$, is the temperature where the first derivative of oxygen content as a function of temperature is a minimum, as measured by thermogravimetric analysis in pure $O_2$ with heating and cooling rates of 0.1° C./minute. The manganese oxides may have a temperature of maximum oxygen desorption, $T_{maxD}$, of at most 400° C., of at most 300° C., or of at most 250° C.

BRIEF DESCRIPTION OF THE DRAWINGS

FIGS. 2a, 2b, 2c, 2d and 2e are graphs of oxygen absorption/desorption of the ceramic material;

FIG. 4a and FIG. 4b are graphs of TGA oxygen content versus temperature for the ceramic material with heating (4a) and cooling (4b);

FIG. 9a and FIG. 9b are graphs of TGA (9a) and dilatometry (9b) measurements for $DyMnO_3$ in 21% $O_2$;

FIG. 10a and FIG. 10b are graphs of (10a) TEC values for $P6_3$ cm and $Hex_2$ phases and (10b) chemical expansion (CE) parameter during the $Hex_2$–$P6_3$ cm phase transition for $Dy_{1-x}Y_xMnO_{3+\delta}$;

DETAILED DESCRIPTION

Figure 1A:
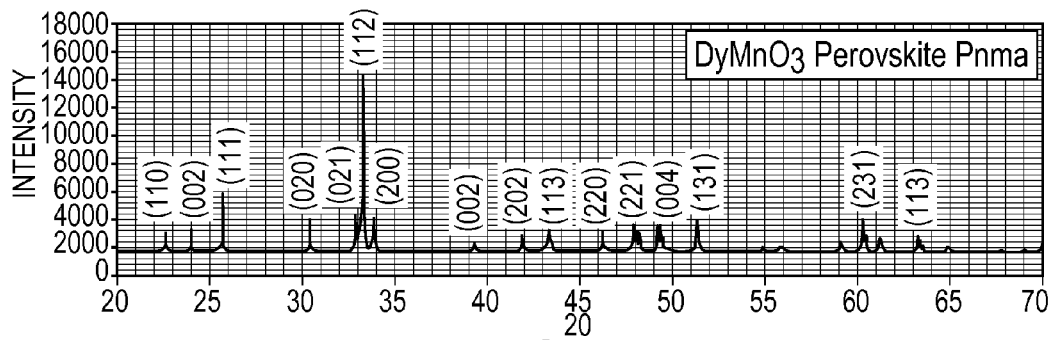
FIGS. 1a, 1b, 1c and 1d are X-ray diffraction patterns of the ceramic material.
Figure 1B:
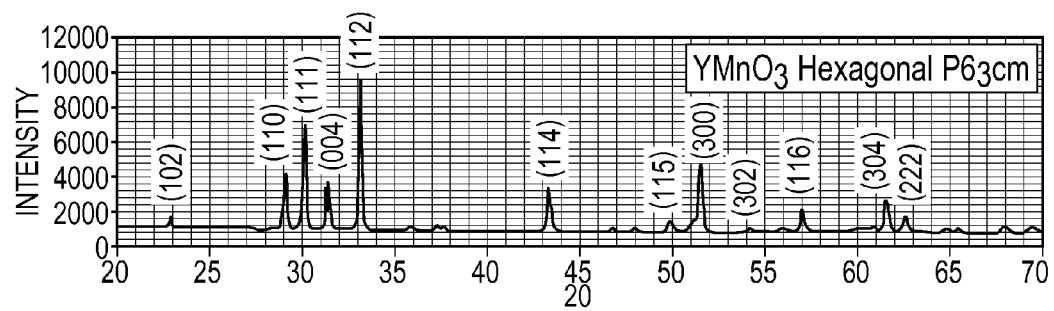
Figure 1C:
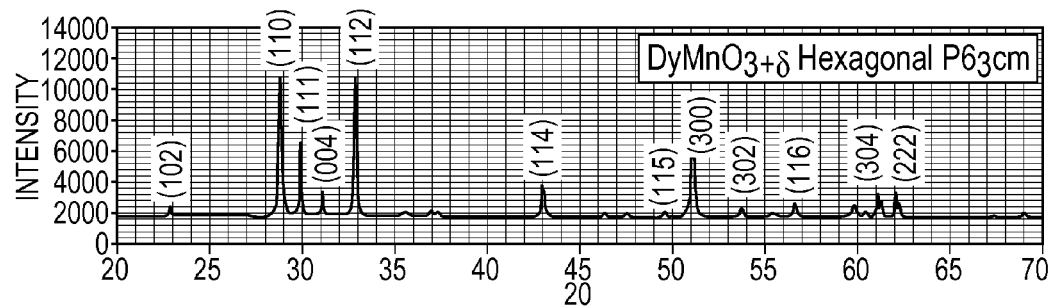
Figure 1D:
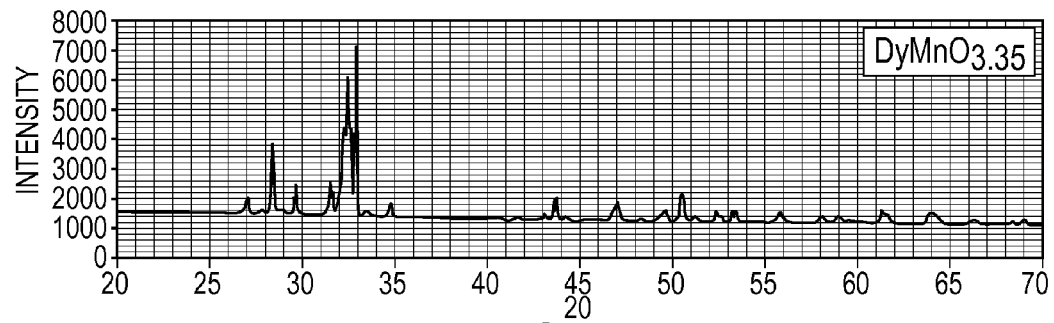

The present invention provides a new system of ceramic materials for elevated temperature air separation methods, oxygen storage, or any process related to temperature or oxygen partial-pressure dependent absorption and desorption of oxygen. These processes are, but not limited to, Thermal Swing Absorption (TSA) and Ceramic Autothermal Recovery (CAR) methods.

The materials of the present invention behave like an "oxygen sponge." Just as a sponge can absorb and release water under different pressures, the materials of the present invention can absorb and release oxygen when exposed to different temperatures or gasses. This property can be used to separate the major components of the air in the atmosphere, oxygen and nitrogen, by storing the oxygen in the ceramic materials, leaving nitrogen in the atmosphere. The oxygen that is absorbed and stored in the material is preferably oxygen ions, $O^{2-}$. The ceramic materials are able to selectively absorb and release oxygen with near 100% selectivity and not absorb other gases. This is a key property that makes the materials excellent OSC materials.

The present invention provides for a ceramic material system that is represented by the formula

where

A: one or more trivalent rare earth ions and tetravalent rare earth elements,

B: one or more alkaline earth metals and Pb, Bi, In and Sc,

C, D: one or more oxygen bi-pyramidally-coordinated cations among which at least one is a transition metal or post-transition metal, where j>0, k≥0, and, independently, m≥0, n≥0, and j+k=1, m+n=1, and 0<δ≤0.5. In other words, C and D can be any transition metal or post-transition metal, for example, groups 3 through 12 on the periodic table (Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, Rf, Db, Sg, Bh, Hs, and Cn) and Ga, In, Sn, Tl and Pb. The metal oxide has high oxygen diffusibility and large oxygen nonstoichiometry at a low temperature region of 400° C. or less and a ceramic is disclosed for oxygen storage and/or an oxygen selective membrane comprised of the metal oxide.

A and B can be chosen from the following ions: 3+ ions: Y, La, Pr, Nd, Sm, Eu, Gd, Tb, Ho, Dy, Er, Tm, Yb, Lu, Bi, In and Sc; 4+ ions: Th and Ce; and 2+ ions: Ca, Sr, Ba and Pb.

Alternatively, the ceramic materials are manganese oxides, for example rare-earth manganese oxide, containing M1, optionally M2, Mn and O. M1 is selected from Sc, Y, Dy, Ho, Er, Tm, Yb and Lu; M2 is different from M1, and M2 is selected from Sc, Y, La, Ce, Pr, Nd, Sm, Eu, Gd, Tb, Dy, Ho, Er, Tm, Yb and Lu. In some compositions, Mn and O are present in an atomic ratio of 1:z, and z is at least 3.1. In some compositions M1 and M2 are present in an atomic ratio of x:1-x, and x=0 to 1. In some compositions Mn has a formal oxidation state between 3 and 4. Preferably, the manganese oxide has an average temperature of maximum oxygen absorption upon heating and cooling, $T_{maxA}$, of at most 400° C., and a temperature of maximum oxygen desorption, $T_{maxD}$, of at most 400° C.

It is also possible to substitute other metals for Mn in the ceramic manganese oxides. For example, 10 atomic %, or 15 atomic % of the Mn could be substituted with Co, Ni, Fe, Cu, Ru, Rh and/or In.

The value of z, which corresponds to the atomic ratio of oxygen per manganese, may be at least 3.2, or at least 3.24, or 3.1 to 3.4. It is also possible to remove oxygen, and have a value of z which is less than 3, for example where z is at most 2.9, or at most 2.8, such as 2.88 to 2.80. Preferably, the manganese oxide has an average temperature of maximum oxygen absorption upon heating and cooling, $T_{maxA}$, of at most 400° C. (including at most 300° C., and at most 250°

C.), and a temperature of maximum oxygen desorption, $T_{maxD}$, of at most 400° C. (including at most 300° C., and at most 250° C.).

The hexagonal $DyMnO_3$ and $YMnO_3$, (materials with no excess oxygen ($\delta=0$)) are previously known compounds with known crystal structures. The ceramic material system is a new material having a new crystal structure with excess oxygen (as indicated by $\delta>0$, these excess oxygen ions belong to the crystal structure. Their inclusion in crystal structure as $O^{2-}$ ions is compensated by oxygenation of Mn ions from 3+ to 3+2$\delta$, such that the overall charge neutrality is preserved). In the example below, $Dy_{1-x}Y_xMnO_{3+\delta}$ is synthesized, wherein based on the above formula, A=Dy, B=Y, and C and D=Mn, and $0 \le x \le 1$.

The present invention provides for a method of making the ceramic materials by synthesizing hexagonal $P6_3$ cm material, and oxygenating the material in partial-pressures of oxygen at low elevated temperatures (200-300° C.). This is also further described in the example below.

Unlike other oxygen storage materials, which depend on the creation of oxygen ion vacancies at high-temperatures, this system relies on a reversible phase transition between $\delta=0$ and $\delta=0.25$-0.5 phases at lower temperatures of approximately 300° C. They exhibit large changes of oxygen content over both a narrow temperature range and a small difference of oxygen pressure near atmospheric conditions. These attributes of this system allow use of inexpensive processes to incorporate and extract large quantities of oxygen.

An oxygen conducting membrane may be prepared from the manganese oxides, in combination with a support material. Because the oxygen absorption and conduction occur at temperatures much lower than in the perovskite materials, a much larger variety of support materials may be used. Possible support materials include materials which decompose when exposed to air at a temperature of 500° C., 400° C. or even 300° C., or which have a glass transition temperature or a melting point of at most 500° C., at most 400° C. or at most 300° C. Specific examples include organic polymers, silicone rubbers, glass, graphite, carbon black, aluminum, copper, iron, nickel, steel, zinc, tin, lead and alloys thereof. The manganese oxide forms a contiguous structure exposed on both opposing surfaces of the membrane. It may also be desirable for the support material to form a contiguous structure exposed on both opposing surfaces of the membrane, especially in the case of an electrically conductive support (see, for example, Thorogood et al., U.S. Pat. No. 5,240,480).

The present invention provides for a method of storing oxygen, including the steps of exposing the ceramic system to oxygen, containing gas, selectively absorbing the oxygen in the system, and storing the oxygen. It has been discovered that these hexagonal materials have unusually large oxygen absorption at approximately 200-300° C. in oxygen atmospheres (storage, excess oxygen preserved on cooling to room temperature). The following steps are involved in the process of oxygen storage: oxygen molecules 2 present in a gas (for example air) reach the surface of the material where they are split to oxygen ions, the oxygen ions then diffuse through the crystal lattice of material and congregate near ions of the system such as manganese to form newly discovered crystal structures ($\delta>0$).

These drastic uptakes of oxygen were observed to completely desorb when materials transitioned back to the stoichiometric $P6_3$ cm state ($\delta=0$) during increased heating of the system to 275-375° C. or changing to lower oxygen partial-pressures (release) surrounding the system. The steps involved in the process of oxygen release occur in reverse order: oxygen ions diffuse towards the material surface, oxygen ions recombine on the surface to form molecular $O_2$, which can be extracted and used. Therefore, the present invention also provides for a method of releasing oxygen, including the step of releasing the oxygen absorbed in the ceramic system.

For example, these materials can be used with known processes for air separation with OSC materials such as TSA and CAR. Thermal Swing Absorption (TSA) relies on temperature dependent oxygen absorption/desorption of its "oxygen carrier". In this method, multiple beds of sorbent cycle in between two chambers that are at different temperatures. This creates oxygen rich and oxygen deficient atmospheres in each chamber. More recently, a method was patented in 2000 by Lin et al. (U.S. Pat. No. 6,059,858) for perovskite materials, which combines TSA and PSA (Pressure Swing Absorption) techniques in a process named Ceramic Autothermal Recovery (CAR). Again, multiple beds filled with sorbent are cycled through two chambers with a temperature gradient; however, in this method the chambers are also at different oxygen partial-pressures. Again, this creates two chambers that are oxygen rich and deficient. Sorbents designed for CAR also have endothermic reduction and exothermic absorption; therefore, the process operates autothermally, needing little or no heat added once operational.

The present invention provides for a method of separating gaseous or molecular $O_2$ from at least a second gas, by exposing the ceramic system to the gaseous or molecular $O_2$ and second gas, absorbing the gaseous or molecular $O_2$ into the system, and separating the gaseous or molecular $O_2$ from the second gas. This method can be performed with any number of gasses present, and allows for separation of gaseous or molecular $O_2$ from the other gasses. Preferably, the second gas is nitrogen in separating oxygen from air. Other second gasses include hydrogen, He, Ne, Ar, Kr, Xe, Rn, $N_2$, CO, $CO_2$, $CH_4$.

In the example below, polycrystalline samples of $Dy_{(1-x)}Y_{(x)}MnO_{3+\delta}$ were synthesized by solid state reaction with appropriate amounts of $Dy_2O_3$, $Y_2O_3$ and $MnO_2$ (all with >99.99% purity). For all samples, reactants were thoroughly mixed in an agate mortar, and fired in air in the temperature range of 800-1200° C. with intermediate grindings followed by pressing samples into high-density pellets. All steps of the synthesis were monitored with X-ray powder diffraction measurements. Samples were fired several times until single phase perovskite was obtained, except for $YMnO_3$, which forms hexagonal structure under these conditions (FIG. 1: X-ray diffraction patterns for $DyMnO_3$ (a) and $YMnO_3$ (b)). Similar to $YMnO_3$ the $HoMnO_3$ and $ErMnO_3$ form hexagonal phases in air. Hexagonal phases were acquired from perovskite samples by firing under ultra-high-purity Argon (99.999%) with a hydroxyl purifier (measured oxygen partial-pressures of 5 to 10 ppm) in a temperature range of 1200-1400° C. (FIG. 1: X-ray diffraction pattern for $DyMnO_3$ (c)). Hexagonal samples were then oxygenated at ambient pressure or under 250-350 bars of oxygen pressure at 200-400° C. followed by cooling at 0.1°/min to room temperature in order to achieve the largest oxygen content possible (FIG. 1: X-ray diffraction pattern for $DyMnO_{3.35}$ (d)).

Figure 2E:
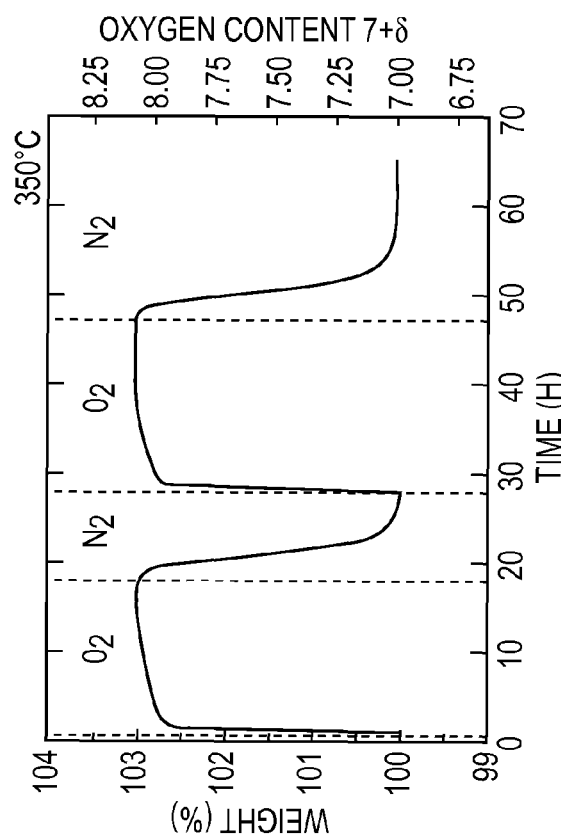
Figure 2D:
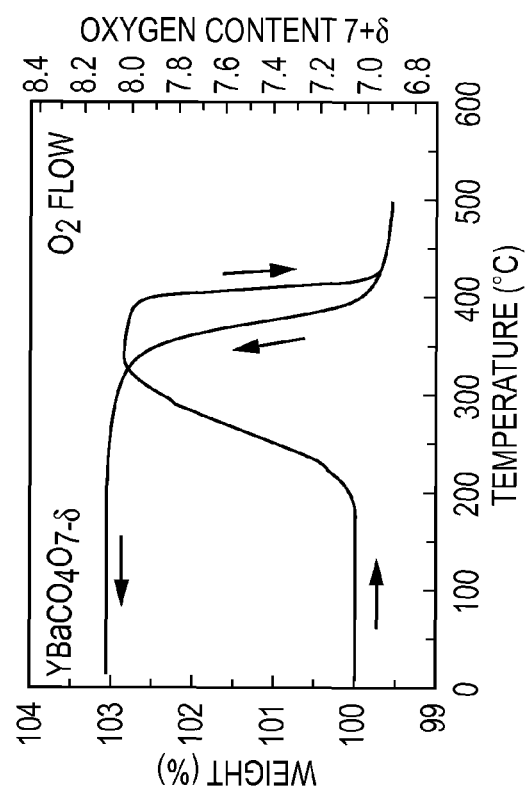

Temperature and oxygen partial-pressure dependence of reversible oxygen storage capacities (OSC) were demonstrated by thermogravimetric analysis (FIG. 2 reversible oxygen absorption/desorption of a typical perovskite material considered for application $Sr_2FeCoO_{5-\delta}$ (a, as evidenced by the data below in the Example), reversible oxygen absorption/desorption of the hexagonal material (b, as function of temperature) and (c, as a function of oxygen pressure), best available oxygen absorption/desorption material from literature: T. Motohashi, S. Kodota, Mater. Sci. Eng. B 148 (2008) 196 (d) and (e)). Hexagonal manganites have been largely believed to remain stoichiometric in oxygen content at elevated-temperatures; however, the thermogravimetric measurements of oxygen annealed hexagonal samples indicated unusually large oxygen absorption over a narrow temperature range ~200-300° C., which return to stoichiometric behavior above 275-375° C. in $O_2$ atmosphere. In addition to temperature dependence, the oxygen content of $Dy_{1-x}Y_xMnO_{3+\delta}$ was also found to be sensitive to changes in partial pressures of oxygen in these temperature ranges. The hexagonal $P6_3$ cm phase of this system was found to have considerable stability at high-temperature in partial pressures of oxygen and to be recoverable from a reduced state with negative values of $\delta$ obtained from reduction in hydrogen at 400° C.

The ceramic system of the present invention can be used for elevated temperature gas separation and oxygen storage methods, which include, but are not limited to, oxygen and nitrogen production and components for oxy-fuel "clean coal" power plants, automotive exhaust catalysts, $H_2$—$O_2$ fuel cells, solar water splitting methods, and steel, copper, and plastic production and any other various industrial production processes which require high-purity oxygen and have large amounts of waste heat. The ceramic system can replace cryogenic distillation or pressure swing absorption for commercial air separation.

The ceramic system of the present invention has several advantages over the prior art. This system of materials has been shown to have comparable OSC with current commercial ceramic materials while operating at lower temperatures and has a smaller necessary temperature gradient for oxygen absorption/desorption. This system can also have faster oxygen absorption/desorption rates. In addition it is made of inexpensive and abundant elements.

The invention is further described in detail by reference to the following experimental examples. These examples are provided for the purpose of illustration only, and are not intended to be limiting unless otherwise specified. Thus, the invention should in no way be construed as being limited to the following examples, but rather, should be construed to encompass any and all variations which become evident as a result of the teaching provided herein.

EXAMPLES

Example 1

Experimental Techniques

Synthesis was done by solid state reaction, which is further detailed in the following section. X-ray powder diffraction (XRD) measurements were made with a Rigaku D/MAX powder diffractometer in the $2\theta=20\text{-}70°$ range with CuK$\alpha$ radiation. Thermogravimetric analysis (TGA) measurements were made with Cahn TG171 and Cahn Ther-Max700 thermobalances in several different partial-pressures of oxygen and hydrogen (balanced with argon) up to 1400° C. at heating and cooling rates of 0.1-1.0°/min. TGA samples were approximately 1 g and were measured with a 5 μg precision. Dilatometry measurements were made with a Linseis Differential Dilatometer L75 and samples were measured with a 1 μm precision.

Results and Discussion

Synthesis and Stability

Polycrystalline samples of hexagonal $Dy_{1-x}Y_xMnO_{3+\delta}$ were synthesized by solid state reaction with appropriate amounts of $Dy_2O_3$, $Y_2O_3$, and $MnO_2$ (all with >99.99% purity). For all samples, reactants were thoroughly mixed in an agate mortar, and fired in air in the temperature range of 800-1300° C. with intermediate grindings followed by pressing samples into high-density pellets at approximately 1 kbar. All steps of the synthesis were monitored with XRD measurements and compared to previous diffraction measurements in the literature of hexagonal $P6_3$ cm and perovskite Pnma phases of $DyMnO_3$ and $YMnO_3$ (FIG. 1). $Dy_{1-x}Y_xMnO_{3+\delta}$ samples which formed the perovskite or a mixed phase in air instead of the single phase hexagonal structure (x=0, 0.1 0.3, 0.5, 0.7), were then fired under ultra-high-purity argon (99.999%) at 1300 and 1400° C. $Dy_{1-x}Y_xMnO_{3+\delta}$ samples (x=0 and 0.1) were then subsequently fired under ultra-high-purity argon with a hydroxyl purifier (oxygen partial pressures of 5-10 ppm) at 1400° C. All samples achieved the hexagonal $P6_3$ cm structure after these conditions.

Considerable effort was devoted to synthesizing Dy-rich, homogenous hexagonal samples. The hexagonal $DyMnO_3$ phase has been previously achieved by epitaxially stabilized crystal growth with thin-films, thermal decomposition with polynuclear coordination compound precursors, quenching methods from 1600° C. in air or 1250° C. in argon for 3 days with sol-gel methods. This work confirmed that synthesis in argon at high-temperature tends to favor the formation of the hexagonal phase, while synthesis in oxygen tends to favor the perovskite phase.

Figure 8:
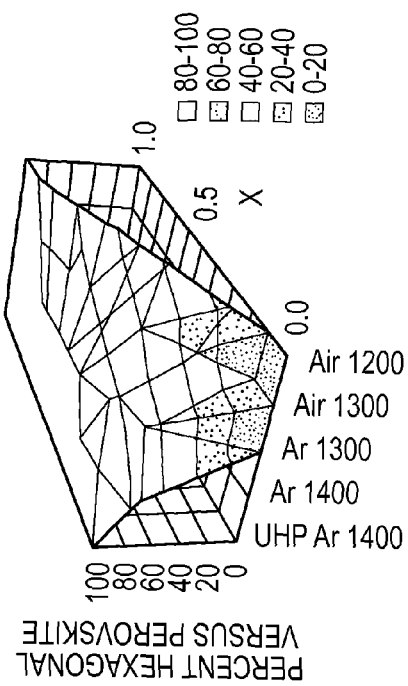
FIG. 8 is a graph showing phase mapping of the ceramic material.

FIG. 8 is a mapping of the phases that were measured with XRD after several synthesis steps, which clearly shows that increasing reducing conditions are needed to form the hexagonal phase as the average ionic radius of the R-site increases. The oxygen content dependence of the tolerance factor, which was previously studied for substituted $SrMnO_3$, is most likely responsible for this behavior. The formation of oxygen vacancies in $RMnO_{3+\delta}$ ($\delta<0$) causes a change in oxidation state in some of the $Mn^{3+}$ cations to $Mn^{2+}$, resulting in a net $Mn^{(3+2\delta)+}$ cation, which increases the (Mn—O) bond length with decreasing $\delta$. TGA measurements in oxygen (FIGS. 4A and 4B) show the reduced oxygen contents after synthesis of single phase hexagonal samples in argon. The resulting larger (Mn—O) bond lengths of these samples decrease their tolerance factor below the lower limit of 0.855 and results in the perovskite phase undergoing a phase transition to the hexagonal phase. Using Shannon room temperature values, the minimum necessary value of $\delta$ ranges from −0.023 to −0.0027 to have t≤0.855. It was observed, however, that samples with the corresponding $\delta$ values did not transform completely to the hexagonal phase (TABLE 1). Previous in situ measurements with Ca and La substituted $SrMnO_3$ have shown that both (Ca,Sr,La—O) and (Mn—O) bond lengths increase with temperature in a manner which increases the value of the tolerance factor. Therefore, the transition from the perovskite phase to the hexagonal phase most likely occurs in various oxygen pressures at $\delta$ which is a function of temperature, which occurs for $DyMnO_{3+.67}$, for example, in ~10 ppm $O_2$ at 1400° C. as observed here or in air at 1600° C. as previously reported. The combination of previous in situ measurements with similar manganites and XRD measurements of various oxygen contents after progressive increased reducing conditions strongly support this conclusion.

TABLE 1

Hexagonal-Perovskite transition δ-values: from condition $t(\delta_{Theo}) = 0.855$, $\delta_{obs.}$ are observed values from TGA, and values of t are calculated with Shannon values.

| X | $\delta_{Theo.}$ | $\delta_{obs.}$ | $t(\delta_{obs.})$ |
|---|---|---|---|
| 0 | −0.0230 | −0.037(0) | 0.852(8) |
| 0.1 | −0.0201 | −0.049(3) | 0.847(0) |
| 0.3 | −0.0143 | −0.015(1) | 0.854(9) |
| 0.5 | −0.0085 | −0.020(9) | 0.853(1) |
| 0.7 | −0.0027 | −0.017(1) | 0.852(7) |

Several other factors can also affect this transition. It can be enhanced by the difficultly of maintaining the twelvefold coordination of R required for the perovskite in a high-temperature, oxygen deficient atmosphere; thus, an eightfold coordination with hexagonal symmetry results. As mentioned in the introduction, the relative large difference in density between the perovskite and hexagonal phases plays a significant role in this transition. The crystal strain of the perovskite phase by Jahn-Teller distortions may also destabilize the structure to favor the hexagonal phase. In any case, the reducing conditions needed for production of bulk polycrystalline samples of $DyMnO_3$ and $Dy_{0.1}Y_{0.9}MnO_3$ by standard firing methods were very near to decomposition to simple oxides and many attempts were needed to find the most favorable temperature and length of the firings. Increased substitution of Y in $DyMnO_3$ considerably eases the necessary reducing conditions to synthesize the hexagonal phase.

The stability of hexagonal $Dy_{1-x}Y_xMnO_{3+\delta}$ compounds was also tested by firing samples at high-temperatures, 1100-1400° C., in oxygen. As reducing conditions favor the hexagonal phase, atmospheres that allow samples to remain near stoichiometric in oxygen content (or yield excess oxygen content, δ>0) at high-temperature promotes the perovskite phase over the hexagonal, due to the smaller size of the $Mn^{(3+2\delta)+}$ cation in oxygen versus argon. Dy rich samples (x=0, 0.1) began slight decomposition back to the perovskite at 1100° C. and completely transformed back to the perovskite at 1400° C. The remaining samples (x=0.7, 0.5, 0.3, 0.1, 0) remained hexagonal with no signs of decomposition back to the perovskite up to 1400° C. These results are in agreement with the presented tolerance factor arguments and can also explain why small rare-earth manganites (R=Y, Ho, Er, Tm, Yb, and Lu) have been observed to transition to the perovskite phase under high-pressure oxygen, while smaller A-site cations (R=Sc and In) will not transform to perovskite under similar conditions.

Thermogravimetric Measurements of OSC

After initial synthesis of the hexagonal phase, all samples were annealed in TGA up to 500° C. with 0.1-1° C./min heating and cooling in various partial-pressures of oxygen and hydrogen to measure OSC values and to demonstrate temperature and oxygen-partial pressure dependence of oxygen content. The oxygen content after initial synthesis of $DyMnO_{3+\delta}$ and $YMnO_{3+\delta}$ were determined with TGA by the difference in weight between oxygenated samples and their respective reduction products, $Dy_2O_3$, $Y_2O_3$, and MnO (verified by XRD), obtained by first annealing at 1° C./minute in $O_2$ and followed by slow reduction at 0.1° C./minute in 42% $H_2$/Ar as shown for $DyMnO_{3+\delta}$ in FIG. 3. $DyMnO_3$ and $YMnO_3$ were observed to reduce to stable stoichiometric $P6_3$ cm phase in oxygen above 375 and 275° C., respectively. Using this information, stable weights of all samples above 400° C. in $O_2$ in TGA were normalized to δ=0. TABLE 2 is a compilation of OSC values achieved by the following assorted methods.

TABLE 2

Figure 5:
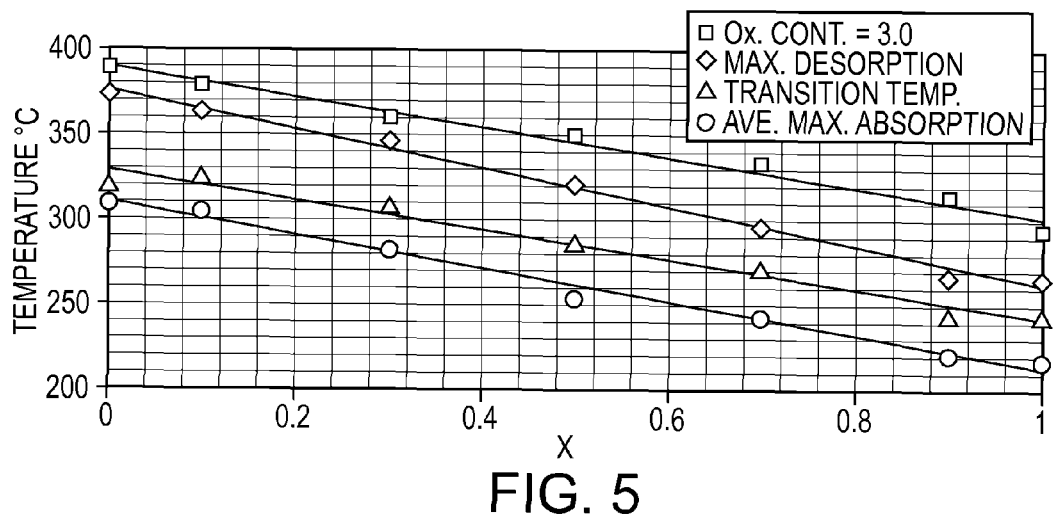
FIG. 5 is a graph showing relevant temperatures for the ceramic material.

OSC (μmol-O/g) of $Dy_{1-x}Y_xMnO_{3+\delta}$; isotherms in AR—$O_2$ were done near "transition temp." on FIG. 5 and reduction in $H_2$ were conducted at 400° C. (*calculated values).

| | cooling rate atmosphere | 1.0° C./min $O_2$ | 0.1° C./min $O_2$ | 0.1° C./min 250 bars $O_2$ | Isotherm Ar—$O_2$ | Theoretical Max. Ar—$O_2/O_2$ | Isotherm - with $H_2$ reduction |
|---|---|---|---|---|---|---|---|
| x | 0.0 | 812 | 926 | 1327 | 770 | 1884* | +455 |
| | 0.1 | 729 | 1138 | 1388 | — | 1937* | +499* |
| | 0.3 | 444 | 1200 | 1397 | 1149 | 2055* | +596* |
| | 0.5 | 637 | 1169 | 1625 | 1091 | 2187* | +705 |
| | 0.7 | 133 | 849 | 1542 | 493 | 2337* | +829* |
| | 0.9 | 176 | 952 | 1694 | — | 2501* | +972* |
| | 1.0 | 53 | 666 | 1338 | 95 | 2606* | +1051 |

Figure 17A:
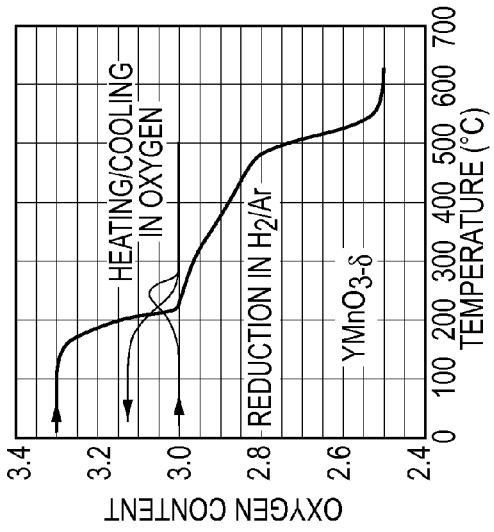
FIGS. 17A, 17B, 17C and 17D show TGA annealing: (17A) in air of $DyMnO_{3+\delta}$ after initial synthesis in argon and subsequent reduction in $H_2$ to $Dy_2O_3$ and MnO; (17B) in oxygen of $YMnO_{3+\delta}$ after initial synthesis in air and reduction in $H_2$ after anneal at 190 atm. of oxygen; (17C) in air for perovskite $La_{0.5}Sr_{0.5}Fe_{0.5}Co_{0.5}O_{3+\delta}$; and (17D) in $O_2$ for perovskite $LaMnO_{3+\delta-}$.
Figure 17B:
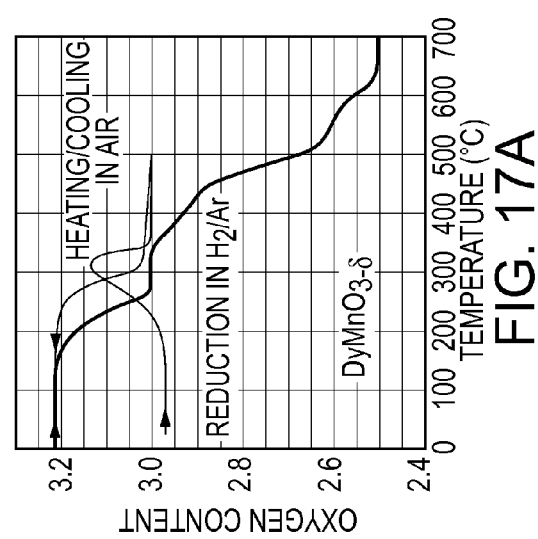
Figure 17C:
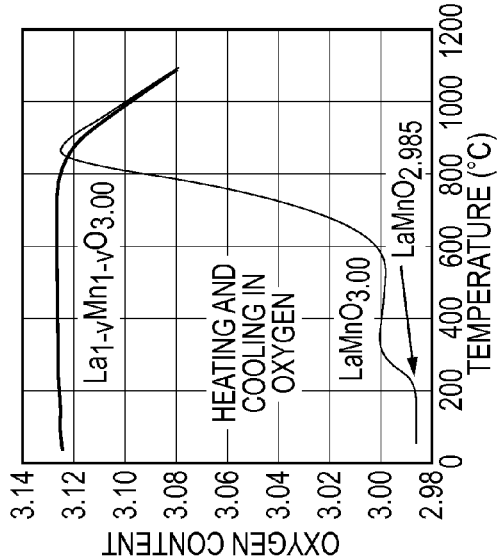
Figure 17D:
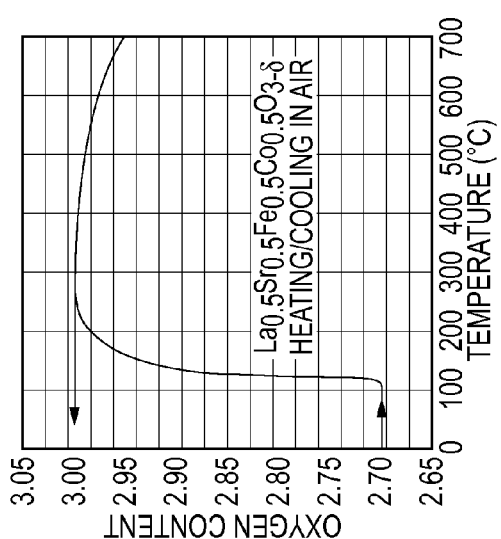
Figure 18:
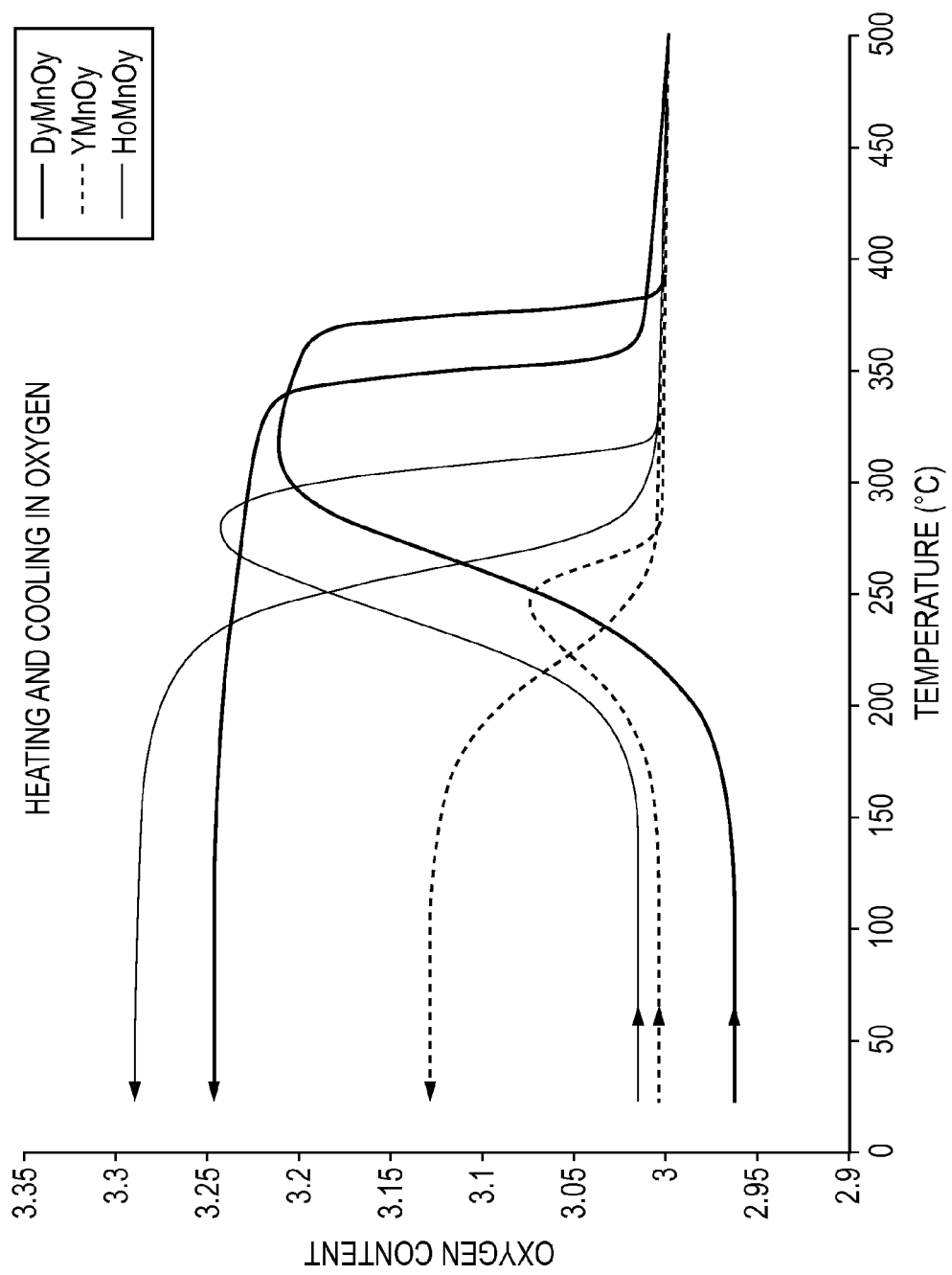
FIG. 18 are graphs of TGA oxygen content versus temperature for the ceramic materials $DyMnO_y$, $YMnO_y$, and $HoMnO_y$ with heating and cooling in oxygen.

The TGA data on heating of $DyMnO_{3+\delta}$ in air (FIG. 17A) clearly shows the reversible absorption (around 250-300° C.) and desorption (above 320° C.) of excess oxygen in a narrow temperature range. On cooling absorption occurs around 280° C. The resulting OSC values measured by the difference in oxygen content between the stoichiometric phase observed above 400° C. (δ=0) and the oxygen content around 200° C. (δ=0.01-0.29) yielded values of 54-1200 μmol-O/g for $Dy_{1-x}Y_xMnO_{3+\delta}$ compounds. Similar TGA measurements for $YMnO_{3+\delta}$ (FIG. 17B) in oxygen showed smaller amounts of oxygen absorption (around 180-240° C.) and desorption (above 260° C.) occurring at lower temperatures. As a comparison, FIGS. 17C-17D show typical TGA traces for perovskite materials $La_{0.5}Sr_{0.5}Fe_{0.5}Co_{0.5}O_{3+\delta}$ and $LaMnO_{3+\delta}$. FIG. 18 shows exemplary oxygen adsorption and desorption on heating and reversible adsorption on cooling in oxygen atmosphere of hexagonal $YMnO_3$ and $DyMnO_3$. These materials show large oxygen non-stoichiometry up to δ=−0.50, indicating possibly very large OSC. However, reaching these values require a wide temperature gradients exceeding 700° C., unlike the hexagonal compounds where δ=0.30-0.40 can be achieved after high oxygen pressure anneal over narrow temperature ranges less than 100° C.

Samples (x=0.1, 0.3, 0.5) were able to attain the highest oxygen contents while having smaller molar weights resulting in OSC values up to 2000 μmol-O/g in air after prolonged annealings. XRD data of these phases for $Dy_{1-x}Y_xMnO_{3+\delta}$ indicate the formation of super structures at δ=0.25 ($Hex_2$) and δ=0.40 ($Hex_3$), which are currently studied with neutron powder diffraction measurements.

$Dy_{1-x}Y_xMnO_{3+\delta}$ materials showed also oxygen content dependence on oxygen partial pressure at constant temperatures. Cycling between $O_2$ and Ar atmospheres for periods of 12 hours at temperatures as low as 300° C. yielded OSC values of 95-1149 μmol-O/g. While the values reported here do not surpass the best observed OSC in the literature, the $Dy_{1-x}Y_xMnO_{3+\delta}$ system does have several advantages for application over other candidate materials. $Dy_{1-x}Y_xMnO_{3+\delta}$ system has the lowest reported absorption/desorption cycling temperatures, being approximately 100° C. lower than the lowest reported temperatures of $YBaCo_{4-x}Al_xO_{7+\delta}$ while showing far superior thermodynamical stability. Additionally, from a hazardous waste and cost standpoints, mass-production of manganese oxides is much preferable to that of cobalt or chromium oxides. Finally, unlike the majority of other OSC materials, which depend on the creation of oxygen ion vacancies at high temperatures, the hexagonal $Dy_{1-x}Y_xMnO_{3+\delta}$ (similar to $YBaCo_{4-x}Al_xO_{7+\delta}$) relies on reversible phase changes due to oxygen filling/discharge of the interstitial sites at much lower temperatures.

Temperature dependence of oxygen content of $Dy_{1-x}Y_xMnO_{3+\delta}$ was measured in TGA with heating and cooling rates of 0.1 and 1.0° C./minute under high-purity oxygen. The resulting TG curves (0.1° C./min, FIGS. 4A and 4B) clearly show the reversible absorption and desorption of oxygen below 400° C. in a narrow temperature range. OSC values were measured by the difference in oxygen content between the stoichiometric $P6_3$ cm phase observed above 400° C. ($\delta=0$) and the final oxygen content after cooling ($\delta=0.01$-$0.29$), which yielded a large range of values, 54-1200 μmol-O/g (TABLE 2). Comparing 0.1 versus 1.0° C./min, resultant TGA curves and OSC values indicate that oxygen absorption rates increase with increased Dy content. Yet, samples (x=0.1, 0.3, 0.5) were able to achieve higher oxygen content than the pure Dy sample on 0.1° C./min cooling. Y-rich samples (x=0.7, 0.9, and 1) were also able to yield larger OSC values than observed in TGA with long isothermal steps with slow cooling and indicate, if given enough time (>24 hours), would reach excesses in oxygen content up to $\delta=0.25$. Four different temperatures were also identified from TGA runs in $O_2$, which are plotted in FIG. 5: the average temperature of maximum oxygen absorption on heating and cooling $$\left(\frac{d(Ox.Cont.)}{d(Temp.)} = \text{local maximum}\right),$$

maximum oxygen desorption $$\left(\frac{d(Ox.Cont.)}{d(Temp.)} = \text{local maximum}\right),$$

transition temperature from oxygen absorption to desorption, and the temperature where samples return to the stoichiometric $P6_3$ cm phase $$\left(\frac{d(Ox.Cont.)}{d(Temp.)} = 0\right)$$

(these can be approximately identified on FIGS. 4A and 4B by inspection). A thermal swing absorption process for air separation for each of these samples can involve cycling in between their respective temperatures slightly above "Ox=3.0" and slightly below "Ave. Max. Absorption" in air. These resulting cycling ranges are approximately 220-300° C. (x=1) to 310-390° C. (x=0) and produce large amounts of $O_2$ over these narrow temperature ranges.

Figure 6:
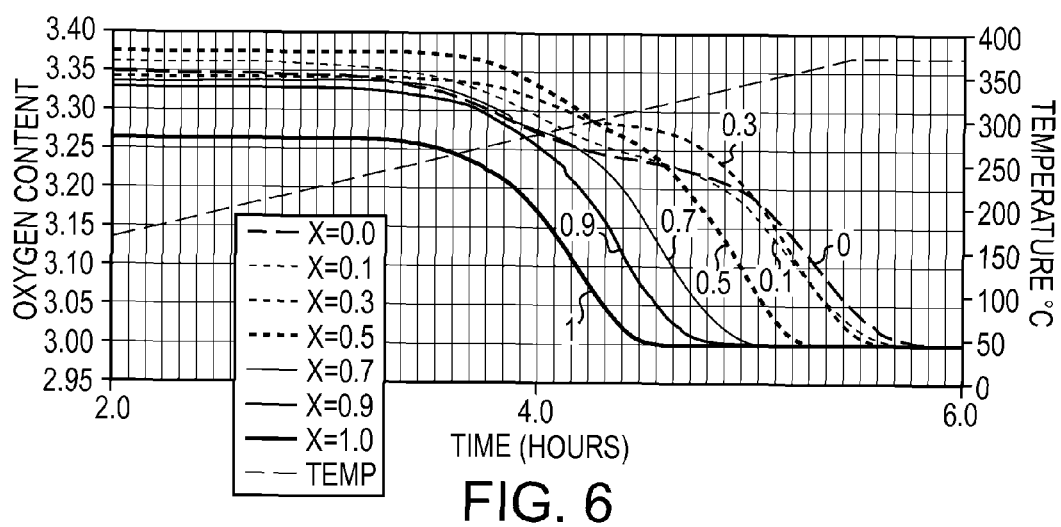
FIG. 6 is a graph of TGA reduction in 21% $O_2$ of high-pressure annealed ceramic material to stable 3.0 oxygen content.

Samples were also annealed at 250 bars of $O_2$ at 400° C. followed by 0.1° C. cooling. The oxygen content of these samples after annealing were determined in TGA by the difference in weight between their starting weight and their weight at 375° C. (1° C./min heating) in 21% $O_2$ normalized to $\delta=0$ (FIG. 6). All samples showed significant increase in OSC (particularly with samples rich in Y content) under high pressure versus identical cooling in 1 bar of $O_2$ (TABLE 2). FIG. 6 also shows increased stability of oxygen content on reduction at ~300° C. for all samples, which shows $Dy_{1-x}Y_xMn^{3+}_{0.5}Mn^{4+}_{0.5}O_{3.25}$ (Hex$_2$) is a stable phase and another stable phase at or above an oxygen content of 3.35 may exist. XRD data of these phases for $DyMnO_{3+\delta}$ have been previously reported and indicate the formation of super structures at $\delta=0.25$ (Hex$_2$) and $\delta=0.40$ (Hex$_3$). Though these samples show increased oxygen content from atmospheric pressure oxygenations, the $Mn^{3+}$ cation is still not completely oxidized to the $Mn^{4+}$ state, which is ideal for maximum OSC values. TABLE 2 also includes these theoretical values of OSC for a reversible $Mn^{3+}$—$Mn^{4+}$($\delta=0$-$\delta=0.5$) transition. The significant increase of calculated OSC values with increased Y content in TABLE 2 is due to the smaller molar weight of Y cation and is one of the reasons why the $Dy_{1-x}Y_xMnO_{3+\delta}$ system was chosen for study after work with hexagonal $DyMnO_{3+\delta}$.

Figure 7:
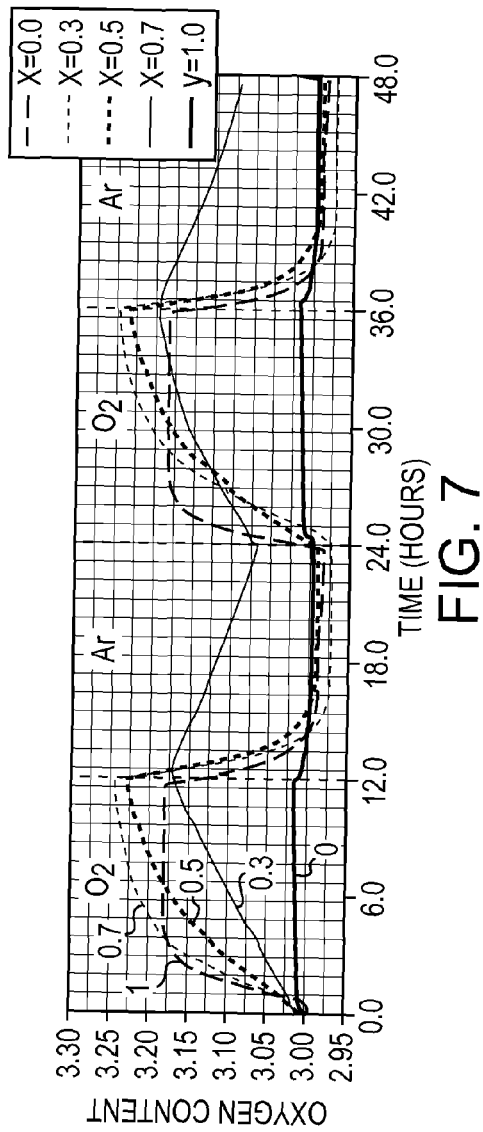
FIG. 7 is a graph of TGA of the ceramic material switching between Ar and $O_2$ at various isotherms.

Oxygen partial-pressure dependence of oxygen content of $Dy_{1-x}Y_xMnO_{3+\delta}$ and absorption/desorption reversibility were demonstrated with TGA measurements at isotherm in cycling $O_2$ and Ar atmospheres every ~12 hours (FIG. 7). Samples were held at temperatures near their respective "transition temperatures" defined from FIG. 5 (for x=0, 0.3, 0.5, 0.7, and 1; T=330, 300, 280, 250, and 230° C., respectively) and yielded OSC values of 95-1149 μmol-O/g (TABLE 2). Besides $DyMnO_{3+\delta}$, which clearly comes to equilibrium in $O_2$, these OSC values are comparisons of absorption after 12 hours. Given more time, these samples can achieve higher oxygen content, for example $\delta=0.28$ was obtained for $Dy_{0.3}Y_{0.7}MnO_{3+\delta}$ after ~60 hours. Isothermal measurements also show oxygen content to have asymptotic behavior significantly lower than achieved upon cooling (most noticeably for x=1 and 0). Further isothermal TGA measurements at various temperatures have also shown this kinetically oxygen-content limiting behavior, which increases equilibration time at lower temperatures (this limiting behavior accounts for the significant differences in absorption rates of FIGS. 4 and 7). Therefore, the OSC of samples (x=0 and 1) increase at lower isothermal temperatures and the desorption rate of x=0.7 increases at slightly higher temperatures. The nature of these transitions from the $P6_3$ cm phase ($\delta=0$) to the Hex$_2$ phase ($\delta=0.25$) and from the Hex$_2$ phase to the Hex$_3$ phase ($\delta=0.40$) appears to easily equilibrate to intermediate oxygen content values. As a result, a mixture of several phases will occur in various oxygen partial-pressures and temperatures, where low-temperatures, 150-200° C., can favor the Hex$_3$ phase; intermediate-temperatures, 230-330° C., favor the Hex$_2$ phase; and high-temperatures, above ~275-375° C., favor the stoichiometric $P6_3$ cm phase (these ranges are dependent on oxygen partial-pressure and Dy/Y content). The slope of oxygen content versus temperature during the $P6_3$ cm–Hex$_2$ phase transition at constant temperature (as well as on cooling in FIG. 4) decreases with increased Y content, which again indicates slower absorption rates of Y-rich samples. Direct comparisons of these absorption rates are, however, complicated by slower oxygen ion kinetics at lower temperatures, which can approximated by $$D = D_0 e^{\frac{-o_A}{RT}}.$$

The lower temperatures at which the $Hex_2-P6_3$ cm phase transition occurs for Y rich samples prevents absorption comparisons at similar temperatures; thus, the differences in absorption observed in FIG. 7 are due to both differences in activation energy and temperature. This increased rate of transition from the $P6_3$ cm phase to the $Hex_2$ phase may also be due to increased distortion to the $P6_3$ cm structure caused by larger average R-site anions. On the other hand, the transition from the $Hex_2$ to $Hex_3$ phase ($\delta \geq \sim -0.25$) appears to favor Y doped $DyMnO_{3.25}$ samples (x=0.1, 0.3, 0.5) over pure $DyMnO_{3.25}$, as seen on cooling in FIG. 4.

Figure 3:
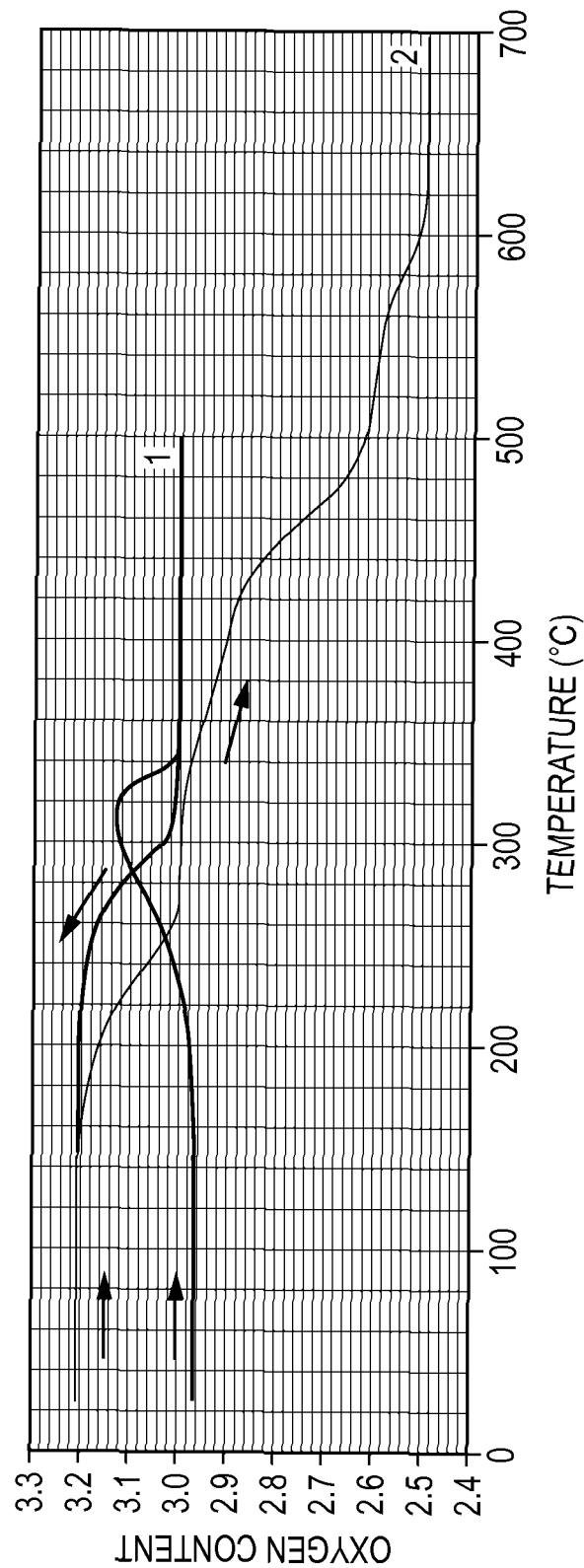
FIG. 3 is a graph of oxygen content versus temperature with TGA annealing and reduction of the ceramic material.

Hydrogen reductions in TGA for $DyMnO_{3+\delta}$ and $YMnO_{3+\delta}$, which were initially done to determine oxygen content, showed to have increased stability on reduction at $\delta=-0.12$ and $-0.20$, respectively (as seen in FIG. 3 for $DyMnO_3$). To test for recoverability of the $P6_3$ cm $DyMnO_{3+\delta}$ and $YMnO_{3+\delta}$ phases, materials were heated to and held at 400° C. in 42% H2/Ar in TGA until these respective values of $\delta$ were reached. These samples were then cooled in Ar to 330 and 230° C., respectively, and held at these temperatures under $O_2$. Samples quickly returned to stoichiometric oxygen content (>1 hour) and continued to absorb oxygen as seen during oxygen cycles in FIG. 7. XRD measurements after this process confirmed that samples did not decompose to simple oxides. Thus, the addition of cycling to 400° C. in hydrogen to either thermal or oxygen partial-pressure cycling would yield an additional ~450-1050 μmol-O/g (for x=0-1) and would place these materials up to near record levels of OSC, ranging from 1150-2650 μmol-O/g (TABLE 2, where calculated values assume the stabilities seen at $\delta=-0.12$ to $\delta=-0.20$ changes proportionally with x for intermediate samples).

While the values measured here do not surpass the best observed OSC in the literature and the slow oxygen kinetics of Y-rich samples (x=0.7, 0.9, 1) may be a limiting factor for their potential use for OSC application, the $Dy_{1-x}Y_xMnO_{3+\delta}$ system does have the several key advantages for application over these other candidates. First and foremost, the $Dy_{1-x}Y_xMnO_{3+\delta}$ system has the lowest reported reduction temperature, being approximately 25-125° C. lower than the record reduction temperature of $YBaCo_{4-x}Al_xO_{7+\delta}$ (with significant OSC values). On further comparison to $YBaCo_{4-x}Al_xO_{7+\delta}$, which decomposes at 550-700° C., $Dy_{1-x}Y_xMnO_{3+\delta}$ has far superior stability, remaining stable up to 1100-1400° C. Additionally, from a hazardous waste and cost standpoint, mass-production of manganese oxides is much preferable to that of cobalt or chromium oxides. Finally, there is great potential for the Mn cation in hexagonal $RMnO_{3+\delta}$ to have large changes in oxidation state because, unlike the majority of OSC materials, which depend on the creation of oxygen ion vacancies or interstitial sites at high-temperatures, the hexagonal $Dy_{1-x}Y_xMnO_{3+\delta}$ (as seen also with $YBaCo_{4-x}Al_xO_{7+\delta}$) relies on reversible phase transitions between several structures containing transition metal ions in variable coordination. The potential OSC of related hexagonal manganites could easily surpass the current highest reported values, if they can be modified to easily and reversibly transition in between phases with large amounts of $Mn^{2+}$ and $Mn^{4+}$ at low-temperatures.

Finally, apart from any possible OSC application, it should be noted that hexagonal manganites have been largely believed to remain stoichiometric in oxygen content at elevated-temperatures. In situ structural measurements at high-temperatures have reported a displacement of the $MnO_5$ bipyramids and a transition to the $P6_3/mmc$ structure, which occur for $YMnO_3$ at ~650° C. and ~950° C., respectively. Slight excesses of oxygen content ($\delta=0.01$) have been reported at 1200° C. for $YMnO_{3+\delta}$ and $ErMnO_{3+\delta}$ but have not observed the non-stoichiometric oxygen content behavior or the associated structural changes at lower temperatures as have been observed with thermogravimetric and XRD measurements. This behavior may not have been previously observed in other hexagonal manganites due to the narrow range of temperature (~200-350° C.) these new phases exist on heating before returning back to $\delta=0$ above ~350° C. and the slow cooling or high oxygen partial-pressures they require. As discussed above, this temperature range has not been of particular interest for structural studies of $RMnO_3$, as most of this work has been done at either low-temperature to study magnetic ordering ($\leq 200$ K) or high-temperature to measure the rattling behavior of the $MnO_5$ bipyramids or structural transitions ($\geq 500°$ C.). The results herein indicate that the hexagonal $RMnO_{3+\delta}$ family is most likely prone to considerable oxygen non-stoichiometry and also show a direct relation between reduction temperature and sorption rates of oxygen to the average ionic size of R. If this is the case, other hexagonal $RMnO_{3+\delta}$ materials with rare-earths that are close in ionic size to that of Y (e.g. Ho and Er) can have similar non-stoichiometric behavior. It should be noted that the synthesis of $YMnO_{3+\delta}$ under fast cooling to room temperature yielded small, but measurable, excesses in oxygen content ($\delta=0.004$). Many studies of $RMnO_{3+\delta}$ use samples prepared at elevated-temperature followed by various cooling rates, which would yield slightly non-stoichiometric samples for low-temperature measurements. Properties associated with excess oxygen content (e.g. disruptions to the exchange interaction or the presence of $Mn^{4+}$) may very well have had a significant impact on the multiferroic properties of these samples, as it has been observed that even slight oxygen and cation non-stoichiometry can have profound effects on magnetic and transport properties of perovskite manganites.

Crystal Structure

Figure 13:
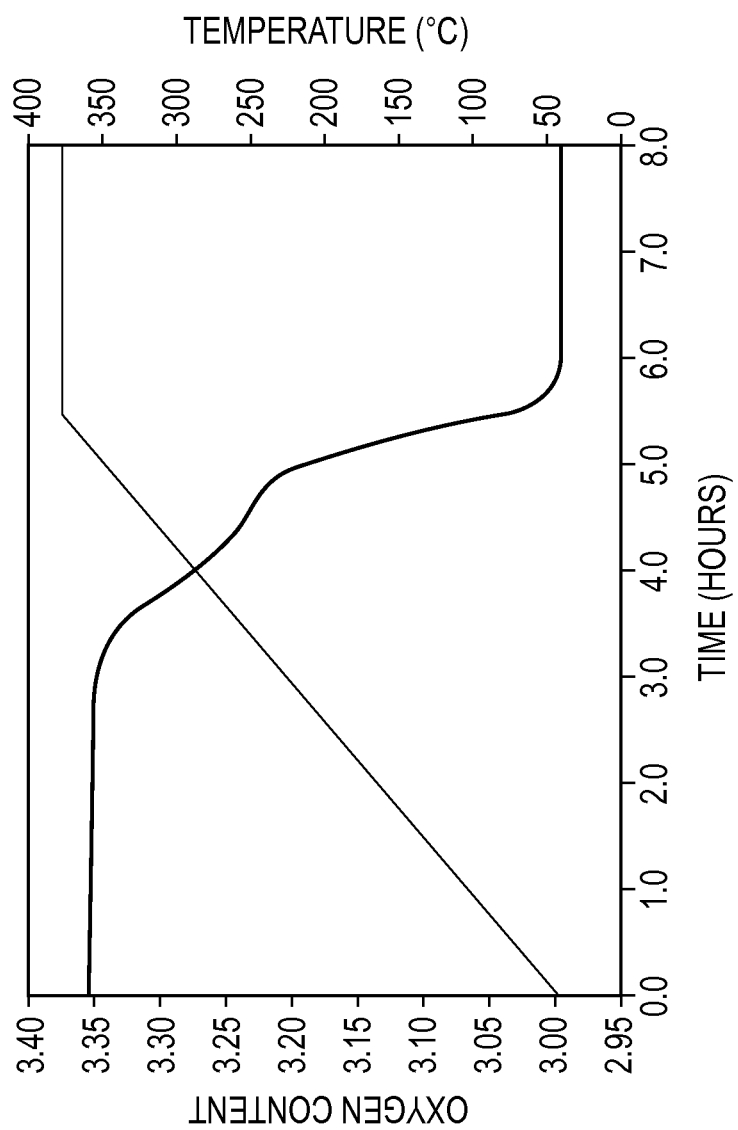
FIG. 13 is a graph of TGA reduction in 21% $O_2$ of high-pressure annealed $DyMnO_{3+\delta}$ to stable 3.0 oxygen content.
Figure 14:
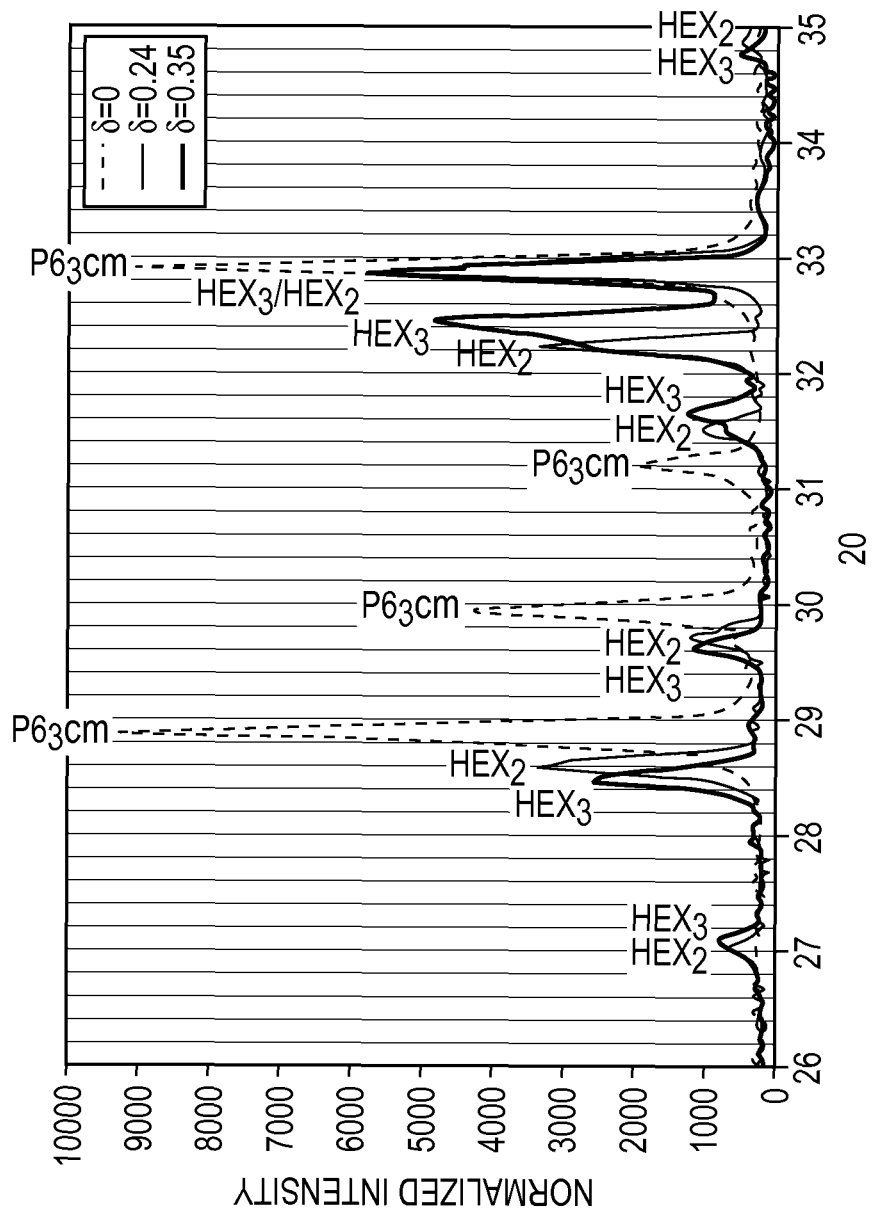
FIG. 14 is a graph of XRD comparison of $DyMnO_{3+\delta}$ samples: $P6_3$ cm ($\delta$=0), nearly single phase $Hex_2$ ($\delta$=0.24), and mixed phase of $Hex_2$ and $Hex_3$ ($\delta$=0.35)

XRD measurements were made to verify the hexagonal $P6_3$ cm structure of $DyMnO_{2.963}$ and $DyMnO_{3.0}$ (samples 1 and 2) and to obtain a preliminary structural understanding of annealed samples. FIGS. 12A-12F are a compilation of XRD patterns collected for samples 1-4, 6 and 7 listed in TABLE 3. Peak positions and intensities of $DyMnO_{2.963}$ and $DyMnO_{3.0}$ were found to be in good agreement with previously reported XRD patterns of $P6_3$ cm $DyMnO_3$. Furthermore, XRD data of the quenched sample (sample 2) confirmed that stoichiometric samples are indeed the hexagonal P6$_3$ cm phase after quenching from above 400° C. as observed with TGA data. XRD patterns of annealed samples (samples 3, 4, and 6) in the δ range of 0.18-0.24 clearly show growth of a second phase (Hex$_2$) and a disappearance of the P6$_3$ cm phase (where arrows indicate the growth and decrease of selected peaks for the P6$_3$ cm and the Hex$_2$ phase, respectively). The diffraction pattern of sample 6 (δ=0.24) is nearly single phase for this new set of peaks and is in agreement with the stability seen in TGA at δ ~0.25 (FIG. 13). Finally, the XRD pattern of the high-pressure annealed sample (sample 7, δ=0.35) shows a decrease of peak intensity for the Hex$_2$ phase and the presence of additional peaks (third phase, Hex$_3$), which is again in agreement with TGA observations. The relative intensities of the Hex$_2$ and Hex$_3$ phases suggest that the Hex$_3$ phase can have an oxygen content of δ=0.40, though this is difficult to approximate due to the high degree of peak position overlapping. To help clarify the development of new peaks and peak overlap, FIG. 14 shows an overlay of XRD patterns of samples 2, 6, and 7 (δ=0.0, 0.24, and 0.35) in the 2θ range of 26-35°. FIGS. 13 and 14 show similarities of the diffraction patterns of the Hex$_2$, Hex$_3$, and P6$_3$ cm phases, which show that the Hex$_2$ and Hex$_3$ phases are structurally related to the P6$_3$ cm phase. The increased number of peaks seen in the Hex$_2$ and Hex$_3$ phases versus the P6$_3$ cm phase also shows a general lowering of symmetry or the formation of a super-structure. Finally, it should also be noted, though these transformations are unlikely at these low-temperatures under O$_2$, that the Hex$_2$ and Hex$_3$ phases were compared to patterns of other known R$_x$Mn$_y$$^{4+}$Mn$_{y-1}$$^{3+}$O$_{3+\delta}$ systems (e.g. pyrochlore R$_2$Mn$_2$O$_7$, perovskite R-3c, R$_2$MnO$_4$ and RMn$_2$O$_5$ phases) and oxides (Mn$_2$O$_3$, MnO$_2$), which can account for the increase in oxygen content. No traces of these structures were observed.

TABLE 3

List of annealed DyMnO$_{3+\delta}$ samples

| Sample no. | Conditions after synthesis of P6$_3$ cm in Ar | Sample type | δ |
|---|---|---|---|
| 1 | None | Small pellets | −0.037 |
| 2 | Quenched from 420° C. air | Small pellets | 0.00 |
| 3 | Cooled from 500° at 1.0° C./min in 21% O$_2$ at standard pressure | Small pellets | 0.18 |
| 4 | Cooled from 500° at 1.0° C./min in O$_2$ at standard pressure | Small pellets | 0.21 |
| 5 | Cooled from 500° at 0.1° C./min in O$_2$ at standard pressure | Small pellets | 0.24 |
| 6 | Cooled from 500° at 0.1° C./min in O$_2$ at ~250 bars | Small pellets | 0.35 |

Guided by the initial XRD investigation, NPD measurements were conducted for selected samples. High-resolution, backscattering data (2θ=144°, Bank 1 of SEPD) were used for DyMnO$_{2.963}$, DyMnO$_{3.0}$, and DyMnO$_{3.21}$ (samples 1, 2, and 4, respectively) at room temperature. Low-angle scattering data (2θ=44°, bank 3) were also used for DyMnO$_{3.21}$ at room temperature. High resolution synchrotron x-ray data were also collected for DyMnO$_{3.21}$ at room temperature.

Figure 15:
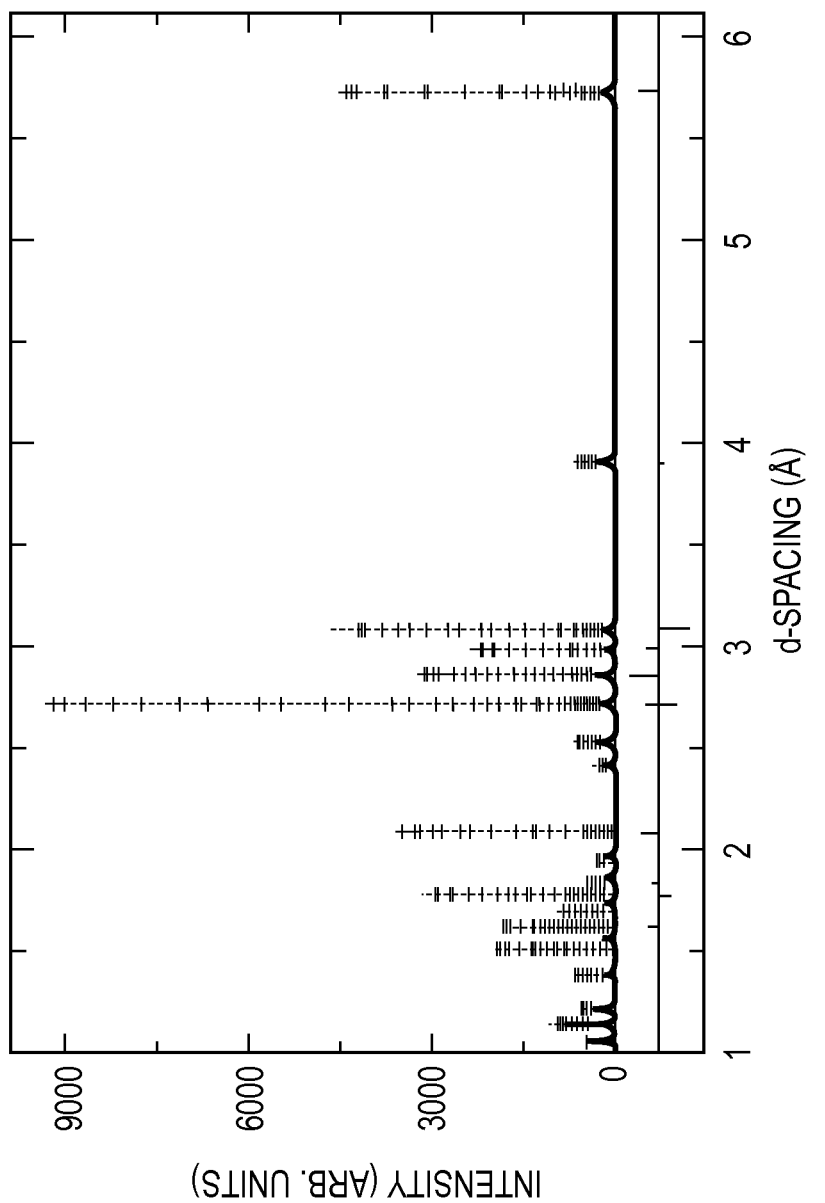
FIG. 15 is a graph of NPD pattern for $DyMnO_{2.963}$ (SEPD), plus signs are observed data and the line below is the difference between experimental data and best fit calculated from the Rietveld refinement method.

Raw data for samples 1 and 2 were analyzed with the Rietveld method in the space group P6$_3$ cm based on previous reports for the hexagonal RMnO$_3$ system and the XRD measurements (FIG. 15). Structural sites of this refinement were 2a for Dy1 and O3; 4b for Dy2 and O4; and 6c for Mn1, O1, and O2. Cations occupancies were fixed at one and the site occupancies of oxygen ions were allowed to vary. Initial refinements of the DyMnO$_{3.0}$ sample's occupancies varied less than one standard deviation from fully stoichiometric oxygen content and were fixed to one for its final fitting. For DyMnO$_{2.963}$ occupancies of the O1 and O2 sites were also fixed to one as refinements yielded values slightly greater than one. Oxygen ion vacancies were found to prefer the O3 and O4 sites nearly equally. The resulting oxygen content of this sample calculated from these refined occupancies (δ=−0.045) is in reasonable agreement with the value obtained from TGA (δ=−0.037). For both these samples (1 and 2), the calculated diffraction pattern of P6$_3$ cm is in good match with the observed data for both samples and their lattice parameters are in agreement with a previous XRD report for DyMnO$_3$. Bond lengths were calculated using the geometric average by assuming full site occupancy. The average (Mn—O) bond length clearly increases from the stoichiometric to the reduced state, while the average (Dy—O) bond length remains, relatively, unchanged. Again, this is due to the enlargement of the Mn$^{(3+2\delta)+}$ cation with increasing oxygen deficiency. These results are in agreement with the oxygen vacancy dependence of the tolerance factor and support the synthesis arguments of forming the hexagonal phase by reduction of the perovskite RMnO$_{3+\delta}$ phase.

Figure 16A:
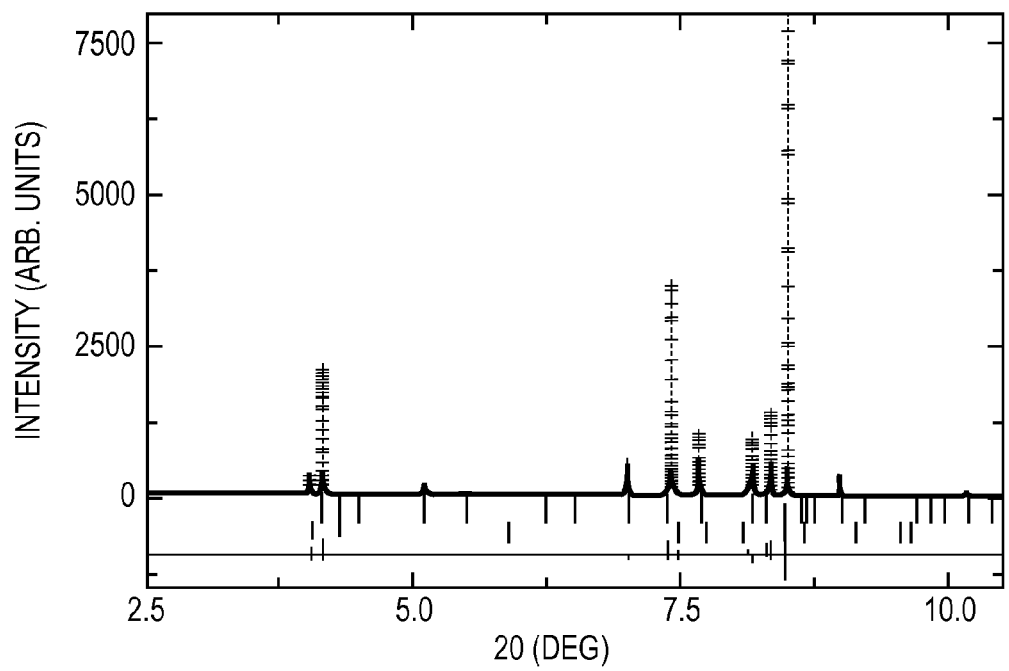
FIG. 16A and FIG. 16B are best-fit Rietveld refinement patterns using high resolution synchrotron X-ray data with a wavelength of 0.40225 Å (11 BM-B), observed (plus signs) and calculated (solid line) intensities are displayed together with their difference (solid line at the bottom of each panel), lower and upper tick marks indicate the locations of Bragg reflections for the parent $P6_3$ cm and superstructure R3 phases, respectively.
Figure 16B:
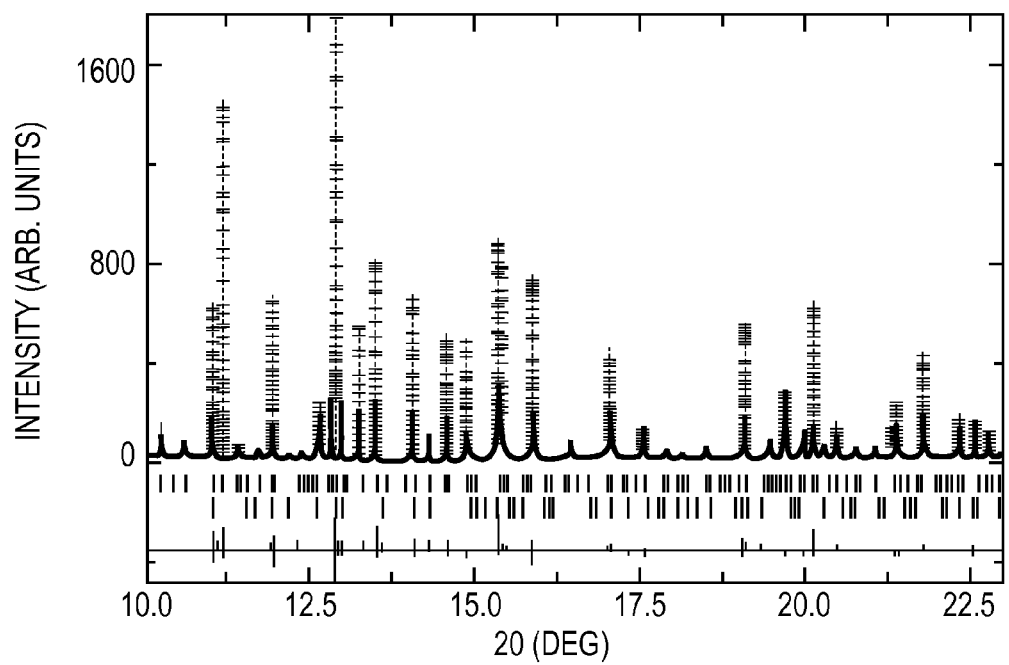

Analysis of neutron and synchrotron diffraction data for sample 4 (DyMnO$_{3.21}$) revealed the formation of a large superstructure constructed by tripling the c-axis of the P6$_3$ cm phase (c>33 Å). Several other superstructure models and combinations of possible phase mixtures were also examined but they all failed to index the large number of extra peaks. Analysis of the superstructure's structural symmetry led to the identification of R3 as the space group that could successfully index all peaks including the tiny ones. We note here that there is no direct relationship between the two P6$_3$ cm and R3 space groups. Such a group/subgroup relationship is not required for two samples that are not chemically the same. A group/subgroup relationship is required when dealing with a unique sample in which structural phase transitions occur at various temperatures or pressures. In the present case, the R3 structure of the oxygen loaded DyMnO$_{3.21}$ sample was determined as the space group of the highest symmetry that can be successfully used to index all Bragg reflections and refine the positions of the Dy and Mn cations. Determination of the exact locations and site occupancies of the diverse oxygen atoms remain challenging due to the complexity of the superstructure and the nature of synchrotron x-rays that are inherently much less sensitive to oxygen than neutrons, especially in the presence of Mn and the heavy Dy rare-earth. Rietveld refinements using synchrotron data are presented in FIGS. 16A and 16B. In the refinements, the cation positions and thermal factors were all refined whereas the oxygen atoms were kept fixed at positions derived from the tripled structure. As shown in FIGS. 16A and 16B, two phases were included in the final refinements: the small parent P6$_3$ cm hexagonal structure (lower tick marks) and the larger R3 superstructure (upper tick marks). Fractional percentages by weight for the two phases refined to 14% and 86%, respectively. It's obvious that the parent phase fails to index the observed extra peaks that refine with R3. The superstructure's lattice parameters are listed in TABLE 4 together with the positions of the Dy and Mn cations in which we have high confidence. The exact determination of the oxygen atoms in such a small molecule-like superstructure would necessitate further collection of high quality neutron diffraction data preferably using new RMnO$_{3+d}$ samples in which the highly neutron absorbing Dy would be replaced by Y or other trivalent rare-earth elements with significantly smaller neutron absorption cross sections such as Ho and Er.

TABLE 4

Structural parameters for the R3 superstructure of DyMnO$_{3.21}$.

| R3 | DyMnO$_{3.21}$ | | | |
|---|---|---|---|---|
| Atom | X | Y | Z | B(Å$^2$) |
| Dy1 | 0 | 0 | −0.06995(5) | 0.30(4) |
| Dy2 | 0 | 0 | 0.07041(5) | 0.04(4) |
| Dy3 | 0 | 0 | 0.25180(11) | 0.19(3) |
| Dy4 | 0 | 0 | 0.43022(6) | 0.97(5) |
| Dy5 | 0 | 0 | 0.57090(6) | 0.50(4) |
| Dy6 | 0 | 0 | 0.74966(11) | 0.32(3) |
| Mn1 | 0.4261(5) | 0.0019(9) | | 2.8(1)[a] |
| Mn2 | 0.3672(7) | 0.6254(6) | 0.50109(21) | 0.47(6)[a] |
| Lattice parameters (Å) | a = 6.231(4) and c = 33.346(3) | | | |
| Reliability factors | R$_{wp}$ = 13.7%, R$_p$ = 9.8%, R$_1$ = 4.4%, c$^2$ = 11.4 | | | |

[a]These values clearly correlate with the undetermined distorted oxygen environment around Mn as expected from the insertion of fractional amounts of additional oxygen. Please see the text for more details.

Thermal and Chemical Expansion

Expansion of the crystal lattice can occur through two mechanisms: thermal and chemical expansion. Thermal expansion (TE), as discussed in tolerance factor arguments, is caused by expansion of the (R—O) and (Mn—O) bond lengths due to increased thermal energy at elevated temperature. Chemical expansion (CE) is caused by expansion of the lattice due to changes in oxygen stoichiometry. The TGA measurements of Dy$_{1-x}$Y$_x$MnO$_{3+\delta}$ materials, discussed above, have shown large changes in oxygen stoichiometry between two stable oxygen content regions, which occur on heating over a relatively short time scale (≤2 hours) and narrow range of temperatures (~100° C.). These characteristics allowed for the measurement of the effective CE over a narrow range of temperatures by simply subtracting the relatively small value of TE from the observed value of CE. Similarly precise measurements of TE, without the any effect from CE, were possible in temperature regions of stable oxygen content. It should also be noted that in some cases the thermal expansion coefficient (TEC) is considered to be the net result of both CE and TE; here these are considered to be separate effects, thus TEC herein is only attributed to TE. The following equations were used to calculate TE and CE:

$$TEC = \frac{1}{L_o}\frac{1}{n-m}\sum_{i=m}^{n}\frac{\Delta L_{i+1} - \Delta L_i}{\tau_{i+1} - \tau_i},$$

measured in K$^{-1}$, where L$_o$, ΔL, and T are the sample starting length, the change in length, and temperature, respectively, and m-n are the sets from the measured temperature ranges and $$CE = \frac{1}{\Delta\sigma}\left(\frac{\Delta L}{L_o} - \langle TEC \rangle \Delta T\right),$$

measured in (moles of O)$^{-1}$, where Δδ is the absolute change in oxygen content from stoichiometric 3.0 and ⟨TEC⟩ is the average TEC of the two oxygen content stable regions.

Figure 11:
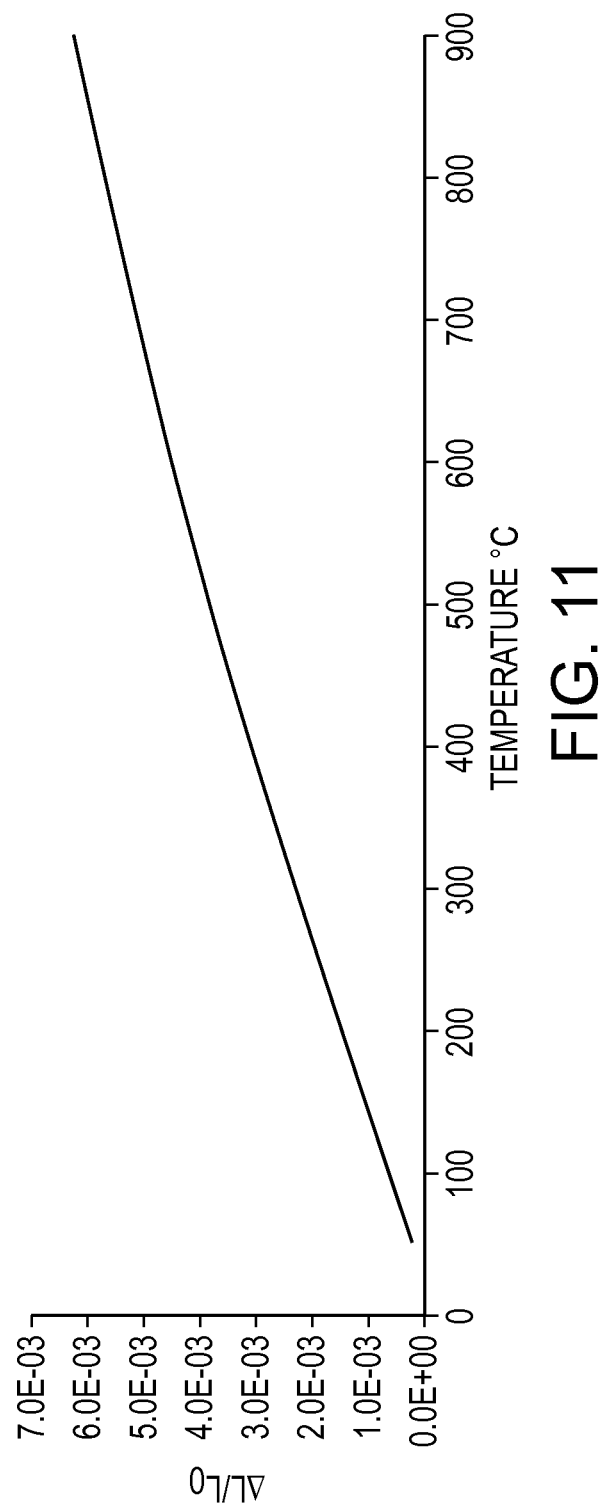
FIG. 11 is a dilatometry measurement of perovskite $DyMnO_3$ in 21% $O_2$.
Figure 12A:
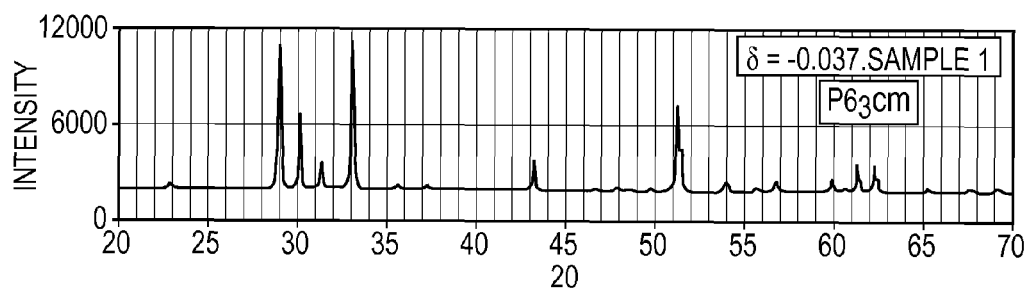
FIGS. 12A, 12B, 12C, 12D, 12E and 12F are XRD patterns of $DyMnO_{3+\delta}$ with $\delta$=−0.037, 0.0, 0.18, 0.21, 0.24, and 0.35, arrows indicate the increase and decrease of peak intensity for hexagonal phases.
Figure 12B:
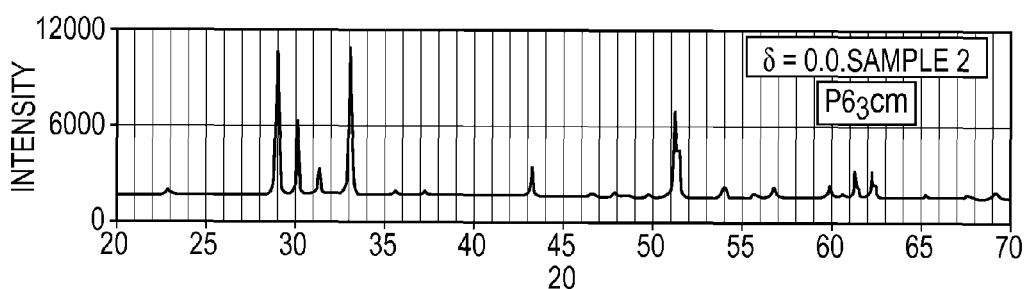
Figure 12C:
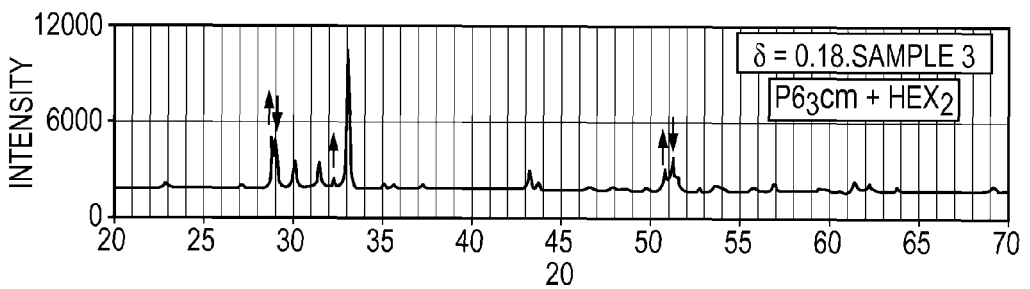
Figure 12D:
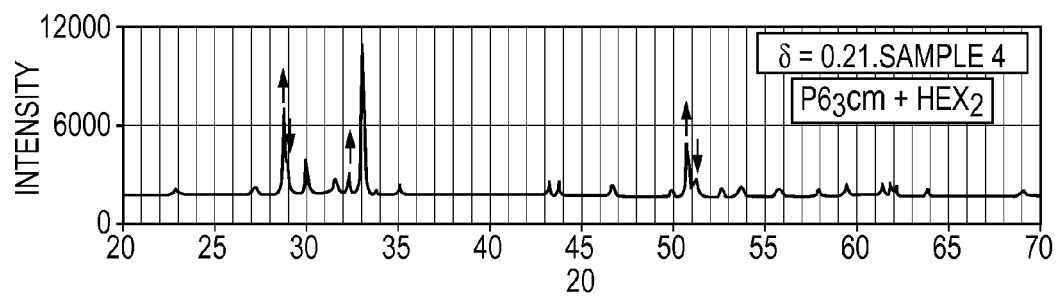
Figure 12E:
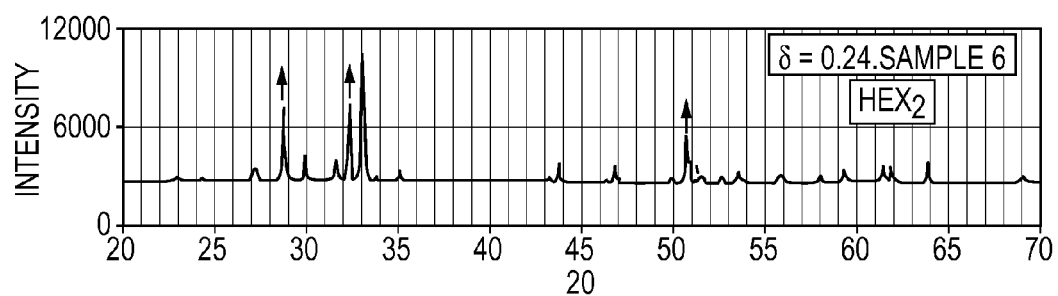
Figure 12F:
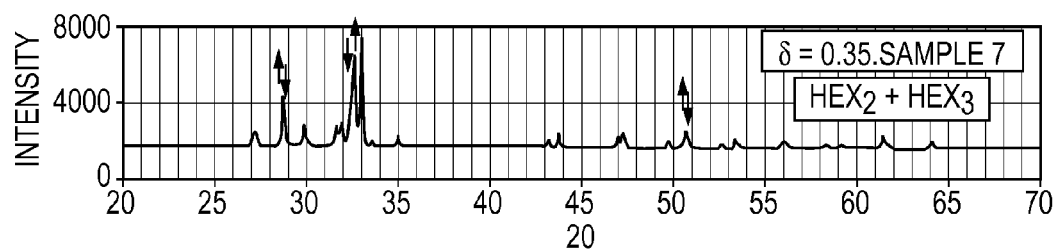

A perovskite sample of DyMnO$_3$ for dilatometry was cut from a dense pellet after initial synthesis in air (~5×3×2 mm in shape) and was measured in 21% O$_2$/Ar atmosphere with heating rates of 0.5° C./min to 900° C. (FIG. 11). Previous studies of the perovskite DyMnO$_{3+\delta}$ phase have shown that it remains stoichiometric in 21% O$_2$/Ar up to ~1000° C., thus the expansion seen in FIG. 8 is solely due to TE. The TEC was measured from 50-850° C. and was found to be 7.3*10$^{-6}$ K$^{-1}$, which is in good agreement with a previous report.

Pellets for dilatometry measurements were cut from dense samples (x=0, 0.3, 0.5, 0.7, 1) after synthesis of the hexagonal material (~5×3×2 mm in shape) and were then annealed at 400° C. with 0.1° C./min cooling in O$_2$. The oxygen contents of these dense samples were also measured with identical conditions on TGA to determine the appropriate temperature ranges to separately extract TE and CE coefficients (the structural phases present and after dilatometry measurements were also confirmed with XRD). TE values were measured for these samples in their respective temperature regions of stable oxygen content observed in TGA for δ=0.22-0.29 (~50-300° C.) and for δ=0 (~600-850° C.). CE values were measured during the reduction between these stable oxygen contents over approximate temperature gradient of ~100° C. in the range of 240-390° C., where approximately 90% of the total oxygen reduction occurs. FIGS. 9A-9B show these measurements for DyMnO$_3$ and illustrates how the combination of dilatometry and TGA measurements was used in to determine TE and CE for all Dy$_{1-x}$Y$_x$MnO$_{3+\delta}$ samples. The lower starting oxygen contents after annealing in oxygen and the slower reduction of dense pellets (as seen for DyMnO$_{3+\delta}$ in FIG. 9A) versus the small chucks of material observed in FIG. 4 during TGA measurement are due to the differences in the samples' density, surface area, and diffusion distances. The TEC of the hexagonal phases in these two temperature regions of stable oxygen content were found to be quite different, 8.2-10.2*10$^{-6}$ K$^{-1}$ (δ=0.22-0.29) and 2.1-5.6/10$^{-6}$ K$^{-1}$ (δ=0), which indicates the TEC of the stoichiometric Hex$_2$ (δ=0.25) and P6$_3$ cm phase are approximately 8.4-11.6*10$^{-6}$ K$^{-1}$ and 2.1-5.6*10$^{0.6}$ K$^{-1}$, respectively (FIG. 10a). The values of chemical expansion during loss of oxygen content are 0.82-3.48*10$^{-2}$ mol$^{-1}$ (FIG. 10B), which increase significantly with Dy content.

Previous reports of single crystal hexagonal RMnO$_3$ materials (R=Y, Ho, Sc, and Lu) have shown to have lattice parameters that linearly increase in-plane and decrease along c with increasing temperature. The contraction of the c-axis has also been shown to increase for larger R ions. Thus, the effect of substantial contraction of the c-axis is responsible for the observed small change of volume of the unit cell and significantly lowers TE of the polycrystalline P6$_3$ cm material when compared to their Hex$_2$ or perovskite phases (7.3*10$^{-6}$ K$^{-1}$ and 6*10$^{-6}$ K$^{-1}$ for the perovskite phase of DyMnO$_3$ and YMnO$_3$, respectively). It is also in agreement with the decrease of the net TE with increased Dy content for P6$_3$ cm materials as seen in FIG. 10A. This tendency is, however, reversed for the Hex$_2$ phase, which shows to have increased TEC with increased Dy content. Finally, an increased rate of contraction along the c-axis at the Curie temperature, ~650° C., was reported previously for YMnO$_3$ and HoMnO$_3$ in one study, but was also not observed in another report. No anomalous behavior near this temperature was observed; however, this effect can be beyond the sensitivity range of the dilatometer for a polycrystalline sample, where anisotropic effects are averaged out. On the other hand, if dense hexagonal RMnO$_3$ materials are also prone to small non-stoichiometric behavior on heating, as seen here for the temperature range of 400-600° C.

($0<\delta<0.015$), this effect can be due to the CE associated with the reduction of a slightly oxygenated sample to stoichiometric oxygen content. The measurements herein show the importance of understanding oxygen content behavior, as slight changes in oxygen content can have similar effects on the net expansion as structural changes, which are not associated with changes in oxygen content (e.g., the $P6_3$ cm to $P6_3/mmc$ phase transition).

The CE during transition from the mixed state $Hex_2/P6_3$ cm (~85-100%, $\delta=0.22-0.25$) materials to nearly single phase $P6_3$ cm has a much larger effect on total expansion than TE. The primary cause of the CE seen during the $P6_3$ cm/$Hex_2$ transition is due to the change in ionic radius of the $Mn^{(3+2\delta)+}$ cation. Finally, for comparison, the CE values reported here are of the same order of magnitude as the CE associated with the absorption and desorption of oxygen in perovskite $LaMnO_3$ or similar substituted perovskite manganites (~$2.4*10^{-2}$ $mol^{-1}$ and ~$1-4*10^{-2}$ $mol^{-1}$). However, the effect of CE for the hexagonal structure is much more prominent than in the perovskite phase, due to the larger change in oxygen content occurring over a much narrower temperature range.

CONCLUSIONS

The results and previous work with perovskite manganites show that the increasingly stronger reducing conditions are needed to form hexagonal $Dy_{1-x}Y_xMnO_{3+\delta}$ with decreasing x (for $x\leq 0.7$). Previous reports of synthesis of the perovskite phase from the hexagonal phase with smaller rare-earths (Ho, Er, and Y) under high-pressure, support the argument that transformations occur at specific values of the tolerance factor due to the temperature, oxygen non-stoichiometry, and compressibility dependence of the (R—O) and (Mn—O) bonds lengths. Hexagonal $Dy_{1-x}Y_xMnO_{3+\delta}$ materials were observed to reversibly absorb large amounts of oxygen at ~200-300° C. and to sharply desorb this uptake of oxygen during transition back to the stoichiometric $P6_3$ cm phase above ~275-375° C. or lower temperatures in lower partial-pressures of oxygen. Increased reversible changes in oxygen content were achieved by annealing at high-pressures ($\delta=0.25-0.35$) and with hydrogen reduction at 400° C. ($\delta=-0.12--0.20$), which, if combined, can yield reversible oxygen storage capacities up to ~2650 μmol-O/g. Rates of oxygen absorption were also observed to significantly decrease with increasing yttrium content. The non-stoichiometric oxygen content of these hexagonal manganites no doubt has profound influence on their multiferroic properties.

REFERENCES

Shelley, S. *Chem. Eng. Prog.* 2009, 105, 6.

Kašpar, J.; Fornasiero, P.; Hickey, N. *Catal. Today* 2003, 77, 419.

Kodama, T.; Gokon, N. *Chem. Rev.* 2007, 107, 4048.

Xu, Z.; Qi, Z.; Kaufman, A. *Power Sources* 2003, 115, 40.

Sakakini, B.; Taufig-Yap, Y.; Waugh, K. *J. Catal.* 2000, 189, 253.

Ciferno, J.; et al. *DOE/NETL*-2007/12912007.

Rydén, M.; Lyngfelt, A.; Mattisson, T.; Chen, D.; Holmen, A.; Bjørgum, E. I. *J. Greenhouse Gas Control* 2008, 2, 21.

Klara, J.; et al. *DOE/NEIL*-2008/13072007.

Readman, J.; Olafsen, A.; Larring, Y.; Blom, R. *Mater. Chem.* 2005, 15, 1937.

Figueroa, J.; Fout, T.; Plasynski, S.; McIlvried, H.; Srivastava, R. I. *J. of Greenhouse Gas Control* 2008, 2, 9.

Pei, S.; Kleefisch, M.; Kobylinski, T.; Faber, J.; Udovich, C.; Zhang-McCoy, V.;

Dabrowski, B.; Balachandran, U.; Mieville, R.; Poeppel, R. *Cata. Lett.* 1995, 30, 201.

He, H.; Dai, H. X.; Au, C. T. *Catal. Today* 2004, 90, 245.

DiMonte, R.; Fornasiero, P.; Graziani, M.; Kašpar, J. *J. Alloys and Comp.* 1998, 275, 887.

Nagai, Y; Yamamoto, T.; Tanaka, T.; Yoshida, S.; Nonaka, T.; Okamoto, T.; Suda, A.; Sugiura, M. *Catal. Today* 2002, 74, 225.

Singh, P.; Hegde, M.; Gopalakrishnan, J. *Chem. Mater.* 2008, 20, 7268.

Karppinen, M.; Yamauchi, H.; Otani, S.; Fujita, T.; Motohashi, T.; Huang, Y.; Valkeapää, M.; Fjellvag, H. *Chem. Mater.* 2006, 18, 490.

Motohashi, T.; Kadota, S.; Fjellvag, H.; Karppinen, M.; Yamauchi, H. *Mater. Sci. Eng.* 82008, 148, 196.

Kadota, S.; Karppinen, M.; Motohashi, T.; Yamauchi, H. *Chem. Mater.* 2008, 20, 6378.

Räsänen, S.; Motohashi, T.; Yamauchi, H; Karppinen, M. *J. Solid State Chem.* 2010, 183, 692.

Chmaissem, O.; Zhen, H.; Huq, A.; Stephens, P.; Mitchell, J. *J. Solid State Chem.* 2008, 181, 664.

Rydén M.; Lyngfelt, A.; Mattisson T.; Chen, D.; Holmen, A.; Bjørgum, E. I. *J. Greenhouse Gas Control* 2008, 2, 21.

Readman, J.; Olafsen, A.; Larring, Y.; Blom, R. *J. Mater. Chem.* 2005, 15, 1937.

Motohashi, T.; Ueda, T.; Masubuchi, Y.; Takiguchi, M.; Setoyama, T.; Oshima, K.; Kikkawa, S. *Chem. Mater.* 2010, 22, 3192.

Yakel, H. L.; Koehler, W.; Bertaut, E.; Forrat, E. *Acta. Cryst.* 1962, 16, 957.

Yakel, H. L. *Acta. Cryst.* 1955, 8, 394.

Shannon, R. D. *Acta. Cryst. A* 1976, 32, 751.

Yakel, H. L.; Koehler, W. C.; Bertaut, E. F.; Forrat, E. F. *Acta. Cryst.* 1963, 16, 957.

Dabrowski, B.; Chmaissem, O.; Mais, J.; Kolesnik, S.; Jorgensen, J. D.; Short, S. *J. Solid State Chem.* 2003, 170, 154.

Dabrowski, B.; Kolesnik, S.; Baszczuk, A.; Chmaissem, O.; Maxwell, T; Mais, J. *J. Solid State Chem.* 2005, 178, 629.

Kamegashira, N.; Satoh, H.; Ashizuka, S. *Mater. Sci. Forum* 2004, 449, 1045.

Park, J.; Park, J. G.; Jeon, G. S; Choi, H. Y.; Lee, C.; Jo, W.; Bewley, R.; McEwen, K. A.; Perring, T. G. *Phys. Rev.* 82003, 68, 104426.

Lee, S.; Pirogov, A.; Han, J. H.; Park, J. G.; Hoshikawa, A.; Kamiyama, T. *Phys. Rev.* 82005, 71, 180413(R).

Ivanov, V. Y.; Mukhin, A. A.; Prokhorov, A. S.; Balbashov, A. M; Iskhakova, L. D. *Phys. Solid State* 2006, 48, 1726.

Carp, O.; Patron, L.; lanculescu, A.; Pasuk, J.; Olar, R. *J. Alloys and Comp.* 2003, 351, 314.

Szabo, G.; Paris, R. A. *Seances Academy Sci. C* 1969, 268, 517.

Brinks, H. W.; Fjellvag, H.; Kjekshus, A. *J. Solid State Chem.* 1997, 129, 334.

Suescun, L.; Dabrowski, B.; Mais, J.; Remsen, S.; Richardson Jr., J. W.; Maxey, E. R.; Jorgensen, J. D. *Chem. Mater.* 2008, 4, 1636.

Zhou, J. S.; Goodenough, J. B.; Gallardo-Amores, J. M.; Morán, E.; Alario-Franco, M. A.; Caudillo, R. *Phys. Rev.* 82006, 74, 014422.

Waintal, A. J. *Chenavas* 1967, 2, 819.

Tachibana, M.; Shimoyama, T.; Kawaji, H.; Atake, T.; Takayama-Muromachi, E. *Phys. Rev.* 82007, 75, 144425.

Uusi-Esko, K.; Malm, J.; Imamura, N.; Yanauchi, H.; Karppinen, M. *Mat. Chem. Phys.* 2008, 112, 1029.

Lonkai, Th.; Tomuta, D. G.; Amann, U.; Ihringer, J.; Hendrikx, R. W. A.; Többens, D. M.; Mydosh, J. A. *Phys. Rev.* 82004, 69, 134108.

Jeong, I.; Hur, N.; Proffen, T. *J. App. Cryst.* 2007, 40, 730.

Kamata, K.; Nakajima, T.; Nakamura, T. *Mat. Res. Bull.* 1979, 14, 1007.

Katsufuji, T.; Masaki, M.; Machida, A.; Moritomo, M.; Kato, K.; Nishibori, E.; Takata, M.; Sakata, M.; Ohoyama, K.; Kitazawa, K.; Takagi, H. *Phys. Rev.* 82002, 66, 134434.

Zhou, J. S.; Goodenough, J. B.; Gallardo-Amores, J. M.; Moran, E.; Alario-Franco, M. A.; Caudillo, R. *Phys. Rev.* 82006, 74, 014422.

Fiebig, M.; Lottermoser, T.; Pisarev, R. V. *Appl. Phys.* 2003, 93, 8194.

Vajik, O. P.; Kenzelmann, M.; Lynn, J. W.; Kim, S. B.; Cheong, S. W. *Phys. Rev. Lett.* 2005, 94, 087601.

Lonkai, Th.; Tomuta, D. G.; Amann, U.; Ihringer, J.; Hendrikx, R. W. A.; Többens, D. M.; Mydosh, J. A. *Phys. Rev.* 82004, 69, 134108.

Jeong, I.; Hur, N.; Proffen, T. *App. Cryst.* 2007, 40, 730.

Rao, C. N. R.; Serrao, C. R. *Mater. Chem.* 2007, 17, 4931.

Choi, W. S.; Kim, D. G.; Seo, S. S. A.; Moon, S. J.; Lee, D.; Lee, J. H.; Lee, H. S.; Cho, D. Y.; Lee, Y. S.; Murugavel, P.; Yu, J.; Noh, T. W. *Phys. Rev.* 82008, 77, 045137.

Nandi, S.; Kreyssig, A.; Yan, J.; Vannette, M.; Lang, J.; Tan, L.; Kim, J.; Prozorov, R.; Lograsso, T.; McQueeny, R.; Goldman, A. *Phys. Rev.* 82008, 78, 075118.

Dabrowski, B.; Klamut, P. W.; Bukowski, Z.; Dybzinski, R.; Siewenie, J. E. *J. Solid State Chem.* 1999, 144, 461.

Bukowski, Z.; Dabrowski, B.; Mais, J.; Klamut, P. W.; Kolesnik, S.; Chmaissem, O. *J. App. Phys.* 2000, 9, 5031.

Zhou, H. D.; Denyszyn, J. C.; Goodenough, J. B. *Phys. Rev.* 82005, 72, 224401.

Remsen, S. Ph.D. *Dissertation*, Northern Illinois University, 2010.

Fu, B.; Huebner, W. *Mater. Res.* 1994, 9, 2645.

Chen, X.; Yu, J.; Adler, S. B. *Chem. Mater.* 2005, 17, 4537.

Miyoshi, S.; Hong, J.; Yashiro, K.; Kaimai, A.; Nigara, Y.; Kawamura, K.; Kawada, T.; Mizusaki, J. *Solid State Ionics*, 2003, 161, 209.

McIntosh, S.; Vente, J. F.; Haije, W. G.; Blank, D.; Bouwmeester, H. *Chem. Mater.* 2006, 18, 2187.

What is claimed is:

1. A method of preparing oxygen, comprising:
   separating oxygen from a mixture of gases containing the oxygen, by conducting the oxygen through a manganese oxide, or absorbing and releasing the oxygen from the manganese oxide,
   wherein the manganese oxide comprises M1, optionally M2, Mn and O, and
   wherein
      M1 is selected from the group consisting of In, Sc, Y, Dy, Ho, Er, Tm, Yb and Lu,
      M2 is different from M1, and M2 is selected from the group consisting of Bi, In, Sc, Y, La, Ce, Pr, Nd, Sm, Eu, Gd, Tb, Dy, Ho, Er, Tm, Yb and Lu, Mn and O are present in an atomic ratio of 1:z, and z is at least 3.15, and
      the separating is carried out at a temperature of at most 400° C.

2. The method of claim 1, wherein z is at least 3.2.

3. The method of claim 1, wherein z is 3.15 to 3.4.

4. The method of claim 1, wherein M1 and M2 are present in an atomic ratio of x:1−x, and x =0.1 to 1.

5. The method of claim 4, wherein x =0.3 to 1.

6. The method of claim 1, wherein M1 is selected from the group consisting of Y and Ho.

7. The method of claim 1, wherein M1 is Y and M2 is selected from the group consisting of La, Ce, Pr, Nd, Sm, Eu, Gd, Tb and Dy.

8. The method of claim 1, wherein M1 is Y and M2 is Dy.

9. The method of claim 5, wherein M1 and Mn are present in an atomic ratio of 1:y, and $0 < y \leq 10$.

10. The method of claim 1, wherein the separating is carried out at a temperature of at most 300° C.

11. The method of claim 1, wherein the separating is carried out at a temperature of at most 250° C.

12. The method of claim 1 wherein the formal oxidation state of Mn is between 3 and 4.

13. The method of claim 12, wherein the formal oxidation state of Mn is 3.3 to 3.8.

14. The method of claim 1, wherein the method is thermal swing absorption or ceramic autothermal recovery.

15. The method of claim 1, wherein z is 3.15 to 3.4,
   M1 and M2 are present in an atomic ratio of x:1−x, and x =0.3 to 1, and
   M1 and Mn are present in an atomic ratio of 1:y, and $0 < y \leq 10$.

16. A method of generating electricity, comprising:
   (1) preparing oxygen by the method of claims 1, and
   (2) burning a carbon-containing fuel with the oxygen, in a generator or power plant.

17. A method of preparing oxygen, comprising separating oxygen from a mixture of gases containing the oxygen, by conducting the oxygen through a manganese oxide, or absorbing and releasing the oxygen from the manganese oxide,
   wherein the manganese oxide comprises M1, M2, Mn and O, and
   wherein:
      M1 is selected from the group consisting of In, Sc, Y, Dy, Ho, Er, Tm, Yb and Lu,
      M2 is different from M1, and M2 is selected from the group consisting of Bi, In, Sc, Y, La, Ce, Pr, Nd, Sm, Eu, Gd, Tb, Dy, Ho, Er, Tm, Yb and Lu,
      M1 and M2 are present in an atomic ratio of x:1−x, and x =0.1 to 0.9,
      Mn and O are present in an atomic ratio of 1:z, and z >3, and
      the separating is carried out at a temperature of at most 400° C.

18. The method of claim 17, wherein z is at least 3.15.

19. The method of claim 18, wherein z is at least 3.25.

20. The method of claim 18, wherein z is 3.15 to 3.4.

21. The method of claim 17, wherein x =0.3 to 0.9.

22. The method of claim 17, wherein M2 is selected from the group consisting of La, Ce, Pr, Nd, Sm, Eu, Gd, Tb and Dy.

23. The method of claim 17, wherein M1 is Y and M2 is Tb.

24. The method of claim 17, wherein z is 3.15 to 3.4, x=0.3 to 0.9, and
   M1 and Mn are present in an atomic ratio of 1:y, and $0 < y \leq 10$.

25. A method of generating electricity, comprising:
   (1) preparing oxygen by the method of claims 17, and
   (2) burning a carbon-containing fuel with the oxygen, in a generator or power plant.

26. A method of preparing oxygen, comprising:
separating oxygen from a mixture of gases containing the oxygen, by conducting the oxygen through an oxygen conducting membrane,
wherein the oxygen conducting membrane comprises
(1) a rare earth manganese oxide, and
(2) a support material,
the membrane has first and second opposing surfaces,
the membrane is not permeable to nitrogen gas,
the rare earth manganese oxide forms a contiguous structure exposed on both the first and second opposing surfaces, and
the rare earth manganese oxide has an average temperature of maximum oxygen absorption upon heating and cooling, $T_{maxA}$, of at most 400° C., and a temperature of maximum oxygen desorption, $T_{maxD}$, of at most 400° C.

27. The method of claim 26, wherein the support material comprises at least one member selected from the group consisting of an organic polymer, a silicone rubber, and glass.

28. The method of claim 26, wherein the support material is electrically conductive, and forms a contiguous structure exposed on both the first and second opposing surfaces.

29. The method of claim 28, wherein the support material comprises at least one member selected from the group consisting of graphite, carbon black, aluminum, copper, iron, nickel, steel, zinc, tin, lead and alloys thereof.

30. The method of claim 26, wherein the average temperature of maximum oxygen absorption upon heating and cooling, $T_{maxA}$, is at most 300° C.

31. The method of claim 26, wherein the temperature of maximum oxygen desorption, $T_{maxD}$, is at most 300° C.

32. The method of claim 26, wherein the support material decomposes when exposed to air at a temperature of 500° C., or has a glass transition temperature or a melting point of at most 500° C.

33. The method of claim 26, wherein the manganese oxide comprises Mn and O in an atomic ratio of 1:z, and z is 3.15 to 3.4.

34. A method of generating electricity, comprising:
(1) preparing oxygen by the method of claims 26, and
(2) burning a carbon-containing fuel with the oxygen, in a generator or power plant.

* * * * *

UNITED STATES PATENT AND TRADEMARK OFFICE
CERTIFICATE OF CORRECTION

PATENT NO. : 9,764,985 B2
APPLICATION NO. : 14/657263
DATED : September 19, 2017
INVENTOR(S) : Bogdan Dabrowski et al.

Page 1 of 1

It is certified that error appears in the above-identified patent and that said Letters Patent is hereby corrected as shown below:

In the Claims

Column 24, Line 26, please delete "claims" and insert --claim--

Column 24, Line 62, please delete "claims" and insert --claim--

Column 26, Line 18, please delete "claims" and insert --claim--

Signed and Sealed this
Eighteenth Day of September, 2018

Andrei Iancu
*Director of the United States Patent and Trademark Office*